United States Patent
Hong et al.

(10) Patent No.: US 12,541,265 B2
(45) Date of Patent: *Feb. 3, 2026

(54) SENSOR DEVICE AND METHOD FOR CONTROLLING SENSOR NODES

(71) Applicant: SAMSUNG DISPLAY CO., LTD., Yongin-si (KR)

(72) Inventors: Jin Taek Hong, Yongin-si (KR); Ja Seung Ku, Yongin-si (KR); Jin Woo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/006,219

(22) Filed: Dec. 30, 2024

(65) Prior Publication Data

US 2025/0130667 A1 Apr. 24, 2025

Related U.S. Application Data

(63) Continuation of application No. 18/233,792, filed on Aug. 14, 2023, now Pat. No. 12,182,356.

(30) Foreign Application Priority Data

Dec. 8, 2022 (KR) .......................... 10-2022-0170791

(51) Int. Cl.
*G06F 3/041* (2006.01)
(52) U.S. Cl.
CPC .............................. *G06F 3/04166* (2019.05)

(58) Field of Classification Search
CPC .. G06F 3/04166; G06F 3/041; G06F 3/04164; G06F 3/0443; G06F 3/0446; G06F 3/0416; G06F 3/044; G06F 3/046
See application file for complete search history.

(56) References Cited

U.S. PATENT DOCUMENTS

| | | | |
|---|---|---|---|
| 7,157,886 B2 | 1/2007 | Agarwal et al. | |
| 9,245,490 B1 * | 1/2016 | Cho | G06F 3/0443 |
| 9,846,502 B2 * | 12/2017 | Lee | G06F 3/04184 |
| 11,073,895 B2 * | 7/2021 | Park | G06F 3/0446 |
| 2023/0131983 A1 | 4/2023 | Park et al. | |

FOREIGN PATENT DOCUMENTS

| KR | 10-2377049 B1 | 3/2022 |
|---|---|---|
| KR | 10-2023-0059954 | 5/2023 |

* cited by examiner

*Primary Examiner* — Antonio Xavier
(74) *Attorney, Agent, or Firm* — Womble Bond Dickinson (US) LLP

(57) ABSTRACT

A sensor device including: a sensor array including sensor nodes; signal lines connected to the sensor nodes; and a sensor driver configured to: select each of the sensor nodes through the signal lines to sense a touch of a user that is adjacent to the sensor array; apply, through a first signal line, a first pulse signal to at least one first sensor node adjacent to the selected sensor node among the sensor nodes; and apply, through a second signal line, a second pulse signal having a polarity reverse to a polarity of the first pulse signal to at least one second sensor node among the sensor nodes, wherein the sensor driver electrically connects the first signal line to the second signal line to adjust voltage levels of the first and the second pulse signals.

19 Claims, 14 Drawing Sheets

SENSOR DEVICE AND METHOD FOR CONTROLLING SENSOR NODES

CROSS-REFERENCE TO RELATED APPLICATIONS

This application is a continuation of U.S. patent application Ser. No. 18/233,792, filed Aug. 14, 2023, which claims priority to and the benefit of Korean Patent Application No. 10-2022-0170791, filed Dec. 8, 2022, the entire content of both of which is incorporated herein by reference.

BACKGROUND

1. Field

Aspects of some embodiments of the present disclosure relate to an electronic device.

2. Description of Related Art

Multimedia electronic devices such as televisions, cellular phones, tablet computers, navigation devices, and game machines may include a display device for displaying images. Electronic devices may include not only typical input interfaces such as buttons, keyboards, and mouses but also touch sensor devices, which allow users to relatively easily input information or commands in an intuitive and convenient manner.

Signals and/or pulses applied to electrodes of the touch sensor device may induce electro-magnetic interference (EMI, or a noise) on components in the touch sensor device, the display device, and/or other components of the electronic device, thus causing degradation in reliability of the operation of the touch sensor device, the display device, and/or electronic device.

The above information disclosed in this Background section is only for enhancement of understanding of the background and therefore the information discussed in this Background section does not necessarily constitute prior art.

SUMMARY

Aspects of some embodiments of the present disclosure relate to an electronic device, and for example, to a sensor device and method for controlling sensor nodes to sense a touch from a user.

Various embodiments of the present disclosure may be capable of providing a sensor device in which occurrence of electro-magnetic interference (EMI) may be minimized or at least reduced, and a method of controlling the sensor device. For example, the sensor device may apply, when applying a target pulse signal to a selected sensor node, a first pulse signal to a first sensor node adjacent to the selected sensor node, and apply a second pulse signal having a polarity reverse to that of the first pulse signal to a second sensor node. Here, the sensor device may temporarily electrically connect the first sensor node and the second sensor node so that voltage levels of the first and second pulse signals can be adjusted. Hence, electro-magnetic interference (EMI) caused in the sensor device may be minimized or may be at least reduced.

According to some embodiments of the present disclosure, a sensor device includes: a sensor array including sensor nodes; signal lines connected to the sensor nodes; and a sensor driver configured to select each of the sensor nodes through the signal lines to sense a touch of a user that is adjacent to the sensor array, and configured to apply, through a first signal line, a first pulse signal to at least one first sensor node adjacent to the selected sensor node among the sensor nodes, and apply, through a second signal line, a second pulse signal having a polarity reverse to a polarity of the first pulse signal to at least one second sensor node among the sensor nodes. According to some embodiments, the sensor driver may be configured to electrically connect the first signal line and the second signal line to each other to adjust voltage levels of the first and the second pulse signals during portions of a period of time for which the first and the second pulse signals are provided.

According to some embodiments, the second sensor node may be adjacent to the first sensor node.

According to some embodiments, the first sensor node may be adjacent to the selected sensor node without another sensor node interposed between the selected sensor node and the first sensor node.

According to some embodiments, the number of at least one second sensor nodes to which the second pulse signal is applied may be identical to the number of at least one first sensor nodes to which the first pulse signal is applied.

According to some embodiments, the sensor driver may include a switch connected between the first signal line and the second signal line, and may be configured to turn on the switch to change the voltage levels of the first and the second pulse signals during the portions of the period of time for which the first and the second pulse signals are provided.

According to some embodiments, each of the first and the second pulse signals may toggle between a first voltage level and a second voltage level. According to some embodiments, during a first partial time period of the period of time for which the first and the second pulse signals are provided, the first pulse signal may make a transition from a first voltage level to a second voltage level, and the second pulse signal may make a transition from the second voltage level to the first voltage level. According to some embodiments, the sensor driver may be configured to electrically connect, during a portion of the first partial time period, the first and the second signal lines to each other to change the voltage levels of the first and the second pulse signals.

According to some embodiments, the sensor driver may be configured to bias the first signal line to the second voltage level and bias the second signal line to the first voltage level during another portion following the portion of the first partial time period.

According to some embodiments, during a second partial time period of the period of time for which the first and the second pulse signals are provided, the first pulse signal may make a transition from the second voltage level to the first voltage level, and the second pulse signal may make a transition from the first voltage level to the second voltage level. According to some embodiments, the sensor driver may be configured electrically connect, during a portion of the second partial time period, the first and the second signal lines to each other to change the voltage levels of the first and the second pulse signals.

According to some embodiments, the sensor driver may be configured to apply a third pulse signal to the selected sensor node through a third signal line among the signal lines. According to some embodiments, the first pulse signal may have a phase substantially identical to a phase of the third pulse signal.

According to some embodiments, the sensor driver may be configured to apply a fourth pulse signal to a third sensor node among the sensor nodes through a fourth signal line among the signal lines. According to some embodiments, each of the third and the fourth pulse signals may toggle between a first voltage level and a second voltage level. According to some embodiments, during a period of time for which the third pulse signal makes a transition from the first voltage level to the second voltage level, the fourth pulse signal may make a transition from the second voltage level to the first voltage level.

According to some embodiments, the first and the second sensor nodes may be between the selected sensor node and the third sensor node.

According to some embodiments, the sensor driver may be configured to electrically connect the third and the fourth signal lines to each other to change the voltage levels of the third and the fourth pulse signals during a portion of the period of time for which the third pulse signal makes the transition from the first voltage level to the second voltage level.

According to some embodiments, the first voltage level may be lower than the second voltage level.

According to some embodiments, the sensor driver may be configured to bias, during a period of time for which a voltage level of the third pulse signal gradually decreases from the second voltage level, the fourth signal line to the second voltage level without electrically connecting the third and the fourth signal lines to each other, so that the fourth pulse signal is adjusted to make a transition to the second voltage level.

According to some embodiments of the present disclosure, in a method of controlling sensor nodes to sense a touch of a user, the method may include: selecting one of the sensor nodes; applying a first pulse signal to at least one first sensor node adjacent to the selected sensor node among the sensor nodes; applying a second pulse signal having a polarity reverse to a polarity of the first pulse signal to at least one second sensor node among the sensor nodes when applying the first pulse signal. According to some embodiments, during portions of a period of time for which the first and the second pulse signals are provided, the first sensor node and the second sensor node may be electrically connected to each other so that voltage levels of the first and the second pulse signals are adjusted.

According to some embodiments, each of the first and the second pulse signals may toggle between a first voltage level and a second voltage level. According to some embodiments, during a period of time for which the first pulse signal may make a transition from a first voltage level to a second voltage level, the second pulse signal may make a transition from the second voltage level to the first voltage level. According to some embodiments, the first and the second sensor nodes may be electrically connected to each other during a portion of the period of time for which the first pulse signal makes the transition from the first voltage level to the second voltage level.

According to some embodiments, selecting one of the sensor nodes may include applying a third pulse signal to the one of the sensor nodes. The first pulse signal may have a phase substantially identical to a phase of the third pulse signal.

The method may further include applying a fourth pulse signal to a third sensor node of the sensor nodes. Each of the third and the fourth pulse signals may toggle between a first voltage level and a second voltage level. During a period of time for which the third pulse signal makes a transition from the first voltage level to the second voltage level, the fourth pulse signal may make a transition from the second voltage level to the first voltage level.

During a portion of the period of time for which the third pulse signal makes the transition from the first voltage level to the second voltage level, the selected sensor node and the third sensor node may be electrically connected to each other so that voltage levels of the third and the fourth pulse signals are changed.

According to some embodiments of the present disclosure, a sensor device includes: a sensor array including sensor nodes; signal lines connected to the sensor nodes; and a sensor driver configured to select each of the sensor nodes through the signal lines and sense a touch of a user that is adjacent to the sensor array, and configured to apply, through a first signal line, a first pulse signal to at least one first sensor node adjacent to the selected sensor node among the sensor nodes, and apply, through a second signal line, a second pulse signal having a polarity reverse to a polarity of the first pulse signal to at least one second sensor node among the sensor nodes. According to some embodiments, a sensor driver may be configured to control, during a portion of a period of time for which voltage levels of the first and the second pulse signals make transitions, the first signal line and the second signal line to share charges with each other so that voltage levels of the first and the second pulse signals are adjusted.

DETAILED DESCRIPTION

Figure 1:
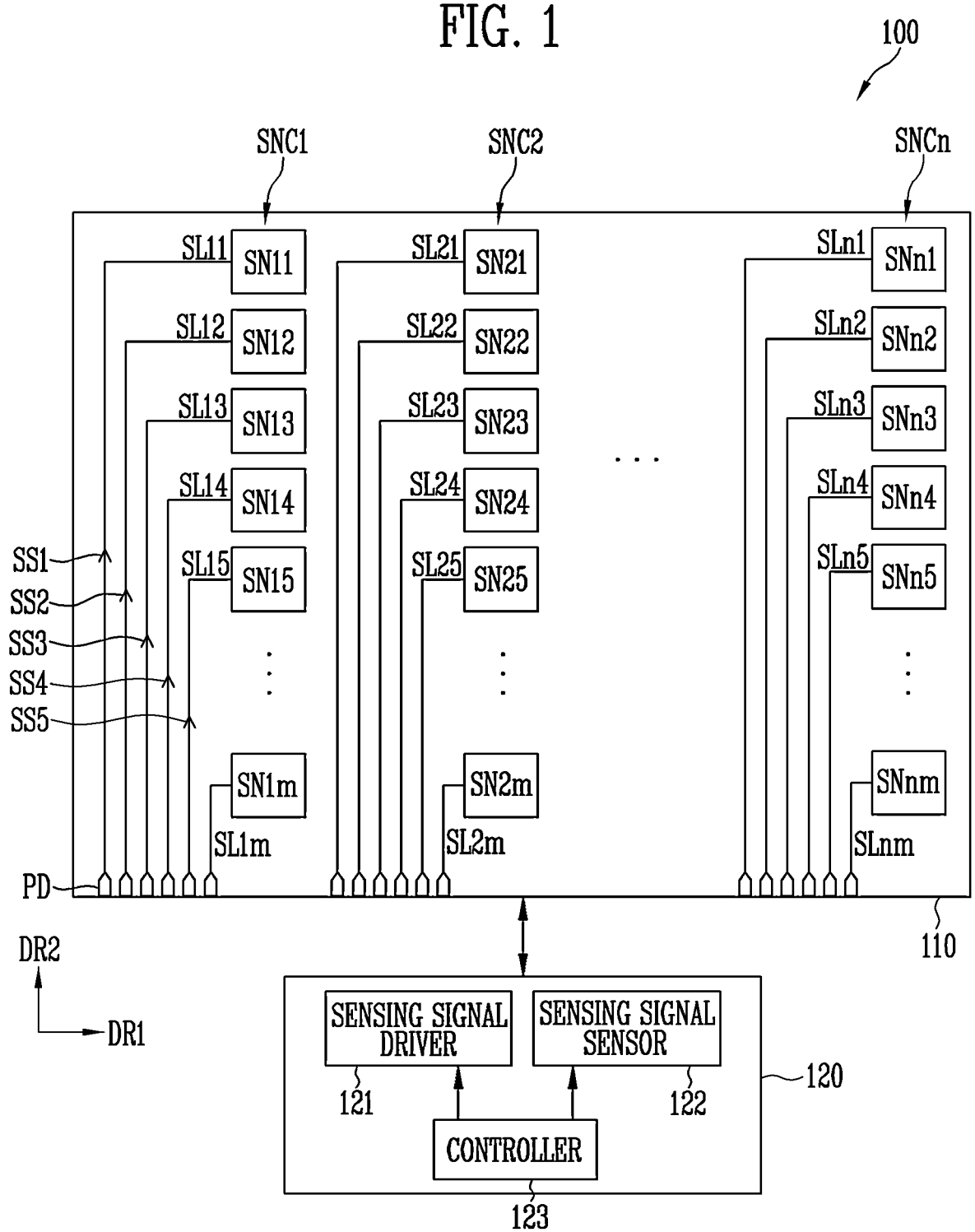
FIG. 1 is a block diagram of a sensor device according to some embodiments of the present disclosure.

Hereinafter, aspects of some embodiments of the present disclosure will be described in more detail with reference to the attached drawings. In the following description, only parts required for understanding of operations in accordance with the present disclosure will be described, and explanation of the other parts may be omitted not to make the gist of the present disclosure unclear. Accordingly, the present disclosure is not limited to the embodiments set forth herein but may be embodied in other types. Rather, these embodiments are provided so that the present disclosure will be thorough and complete, and will fully convey the technical spirit of the disclosure to those skilled in the art.

It will be understood that when an element is referred to as being "coupled" or "connected" to another element, it can be directly coupled or connected to the other element or intervening elements may be present therebetween. The terminology used herein is for the purpose of describing particular embodiments only and is not intended to be limiting. In the specification, when an element is referred to as "comprising" or "including" a component, it does not preclude another component but may further include other components unless the context clearly indicates otherwise. "at least one of X, Y, and Z" and "at least one selected from the group consisting of X, Y, and Z" may be construed as X only, Y only, Z only, or any combination of two or more of X, Y, and Z (for instance, XYZ, XYY, YZ, and ZZ). As used herein, the term "and/or" can include any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element or feature's relationship to another element(s) or feature(s), as illustrated in the drawings. Spatially relative terms are intended to encompass different orientations of a device in use, operation, and/or manufacture in addition to the orientation depicted in the drawings. For example, if the device in the drawings is turned upside down, elements described as "below" or "beneath" other elements or features would then be oriented "above" the other elements or features. Thus, the term "below" can encompass both an orientation of above and below. Furthermore, the device may be otherwise oriented (e.g., rotated 90 degrees or at other orientations), and, as such, the spatially relative descriptors used herein interpreted accordingly.

Herein, various embodiments will be described with reference to drawings that are schematic illustrations of idealized embodiments. As such, variations from the shapes of the illustrations as a result, for example, of manufacturing techniques and/or tolerances, are to be expected. Therefore, embodiments disclosed herein should not be construed as limited to the particular illustrated shapes of regions, but are to include deviations in shapes that result from, for instance, manufacturing. As such, the shapes illustrated in the drawings may not illustrate the actual shapes of regions of a device, and, as such, are not intended to be limiting.

FIG. 1 is a block diagram of a sensor device 100 according to some embodiments of the present disclosure.

Referring to FIG. 1, the sensor device 100 may include a sensor array 110 and a sensor driver 120.

The sensor array 110 may include an array including a plurality of sensor nodes $SN11$~$SN1m$, $SN21$~$SN2m$, . . . , $SNn1$~$SNnm$ (where m and n each is an integer of 1 or more). According to some embodiments, the plurality of sensor nodes $SN11$~$SN1m$, $SN21$~$SN2m$, . . . , $SNn1$~$SNnm$ may be arranged in a first direction DR1 and a second direction DR2 intersecting the first direction DR1, and may be spaced apart from each other. For example, the first direction DR1 may be defined as a row direction, and the second direction DR2 may be defined as a column direction. Each of the plurality of sensor nodes $SN11$~$SN1m$, $SN21$~$SN2m$, . . . , $SNn1$~$SNnm$ may include self capacitance.

The sensor array 110 may further include a plurality of sensing lines $SL11$~$SL1m$, $SL21$~$SL2m$, . . . , $SLn1$~$SLnm$. The plurality of sensing lines $SL11$~$SL1m$, $SL21$~$SL2m$, . . . , $SLn1$~$SLnm$ may be provided as signal lines for transmitting signals from the sensor driver 120 to the plurality of sensor nodes $SN11$~$SN1m$, $SN21$~$SN2m$, . . . , $SNn1$~$SNnm$.

The plurality of sensor nodes $SN11$~$SN1m$, $SN21$~$SN2m$, . . . , $SNn1$~$SNnm$ may be connected one-to-one to a plurality of sensing lines $SL11$~$SL1m$, $SL21$~$SL2m$, . . . , $SLn1$~$SLnm$. In FIG. 1, the sensor nodes $SN11$ to $SN1m$ may be respectively connected to the sensing lines $SL11$ to $SL1m$. The sensor nodes $SN21$ to $SN2m$ may be respectively connected to the sensing lines $SL21$ to $SL2m$. The sensor nodes $SNn1$ to $SNnm$ may be respectively connected to the sensing lines $SLn1$ to $SLnm$.

The sensor array 110 may include a plurality of pads PD. The plurality of sensing lines $SL11$~$SL1m$, $SL21$~$SL2m$, . . . , $SLn1$~$SLnm$ may be connected to the sensor driver 120 through the plurality of pads PD.

For convenience of explanation, FIG. 1 schematically illustrates some of the signals which are transmitted through the plurality of sensing lines $SL11$~$SL1m$, $SL21$~$SL2m$, . . . , $SLn1$~$SLnm$. The first sensing line $SL11$ may transmit a first sensing signal SS1 from the sensor driver 120 to the first sensor node $SN11$. The second sensing line $SL12$ may transmit a second sensing signal SS2 from the sensor driver 120 to the second sensor node $SN12$. The third sensing line $SL13$ may transmit a third sensing signal SS3 from the sensor driver 120 to the third sensor node $SN13$. The fourth sensing line $SL14$ may transmit a fourth sensing signal SS4 from the sensor driver 120 to the fourth sensor node $SN14$. The fifth sensing line $SL15$ may transmit a fifth sensing signal SS5 from the sensor driver 120 to the fifth sensor node $SN15$.

The sensor driver 120 may drive the sensor array 110 to sense a touch of the user which is adjacent to the sensor array 110. The sensor driver 120 may include a sensing signal driver 121, a sensing signal sensor 122, and a controller 123. The controller 123 may transmit control signals to the sensing signal driver 121 and the sensing signal sensor 122 to control overall operations of the sensor driver 120.

The sensing signal driver 121 may apply sensing signals to the plurality of sensor nodes $SN11$~$SN1m$, $SN21$~$SN2m$, . . . , $SNn1$~$SNnm$ through the plurality of sensing lines $SL11$~$SL1m$, $SL21$~$SL2m$, . . . , $SLn1$~$SLnm$ under the control of the controller 123. The sensing signal driver 121 may apply a target pulse signal to one of the plurality of sensor nodes $SN11$~$SN1m$, $SN21$~$SN2m$, . . . , $SNn1$~$SNnm$ as a sensing signal to select the corresponding sensor node. According to some embodiments, the sensing signal driver 121 may sequentially select each of the plurality of sensor nodes $SN11$~$SN1m$, $SN21$~$SN2m$, . . . , $SNn1$~$SNnm$. According to some embodiments, the sensing signal driver 121 may simultaneously select two or more sensor nodes. For example, the plurality of sensor nodes $SN11$~$SN1m$, SN21~SN2m, ..., SNn1~SNnm may be grouped into first to n-th sensor node columns SNC1 to SNCn each including sensor nodes arranged in the column direction. A sensor node may be sequentially selected from each of the first to n-th sensor node columns SNC1 to SNCn. According to some embodiments, column groups each including two or more sensor node columns may be defined, and a sensor node may be sequentially selected from each of the defined column groups.

The sensing signal sensor 122 may sense a touch of the user which is adjacent to the plurality of sensor nodes SN11~SN1m, SN21~SN2m, ..., SNn1~SNnm through the plurality of sensing lines SL11~SL1m, SL21~SL2m, ..., SLn1~SLnm under the control of the controller 123. In response to the touch of the user, capacitance corresponding to an associated sensor node may be changed. The change in capacitance may cause a change of a target pulse signal to be applied to the associated sensor node. The sensing signal sensor 122 may sense the change of the target pulse signal, thus sensing the touch of the user. For example, the sensor driver 120 may sense the touch of the user on the sensor array 110 in a self-capacitance sensing manner. As such, the sensing signal sensor 122 may sense a change in capacitance of a sensor node selected by the sensing signal driver 121 and thus sense a touch input of the user.

According to some embodiments of the present disclosure, the sensor driver 120 may apply, when each sensor node is selected, a first pulse signal to a sensor node adjacent to the selected sensor node, and apply a second pulse signal having a polarity reverse to that of the first pulse signal to a sensor node adjacent to the sensor node to which the first pulse signal is applied. Here, during a portion of a period of time for which the first and second pulse signals are applied, the sensor driver 120 may electrically connect the sensor nodes that receive the first and second pulse signals to each other, and thus may adjust voltage levels of the first and second pulse signals.

In other words, the period of time for which the first and second pulse signals are applied may include a period of time for which the corresponding sensor nodes share electrical charges. Hence, electro-magnetic interference (EMI) to be caused by the first and second pulse signals may be mitigated. Consequently, the operations of the sensor device 100 and a system and/or device including the sensor device 100 may have improved reliability.

Figure 2:
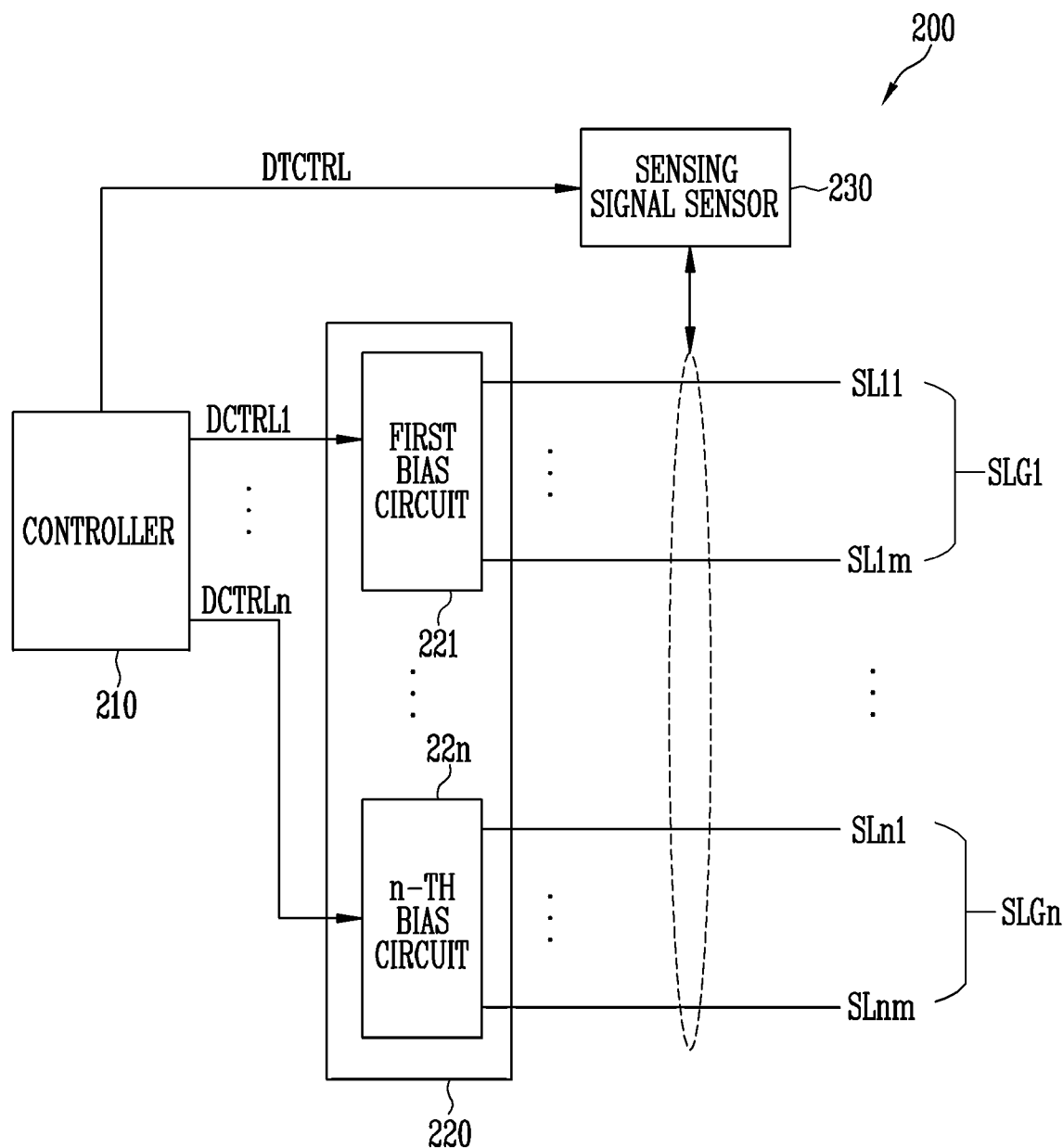
FIG. 2 is a block diagram illustrating aspects of a sensor driver of FIG. 1 according to some embodiments.

FIG. 2 is a block diagram illustrating aspects of the sensor driver of FIG. 1 according to some embodiments.

Referring to FIG. 2, the sensor driver 200 may include a controller 210, a sensing signal driver 220, and a sensing signal sensor 230.

The controller 210 may control overall operations of the sensor driver 200. The controller 210 may be provided as the controller 123 of FIG. 1. The controller 210 may respectively transmit first to n-th driving control signals DCTRL1 to DCTRLn to first to n-th bias circuits 221 to 22n of the sensing signal driver 220 to control the first to n-th bias circuit 221 to 22n. The controller 210 may transmit a sensing control signal DTCTRL to a sensing signal sensor 230 to control the sensing signal sensor 230.

The sensing signal driver 121 and the sensing signal sensor 122 of FIG. 1 may be respectively provided in the same forms as the sensing signal driver 220 and the sensing signal sensor 230. The sensing signal driver 220 may include first to n-th bias circuits 221 to 22n. The first to n-th bias circuits 221 to 22n may be respectively operated in response to first to n-th driving control signals DCTRL1 to DCTRLn received from the controller 210. The first to n-th bias circuits 221 to 22n may respectively drive first to n-th sensing line groups SLG1 to SLGn.

The first to n-th sensing line groups SLG1 to SLGn may be respectively connected to the first to n-th sensor node columns SNC1 and SNCn of FIG. 1. The first to m-th sensing lines SL11 to SL1m of the first sensing line group SLG1 may be respectively connected to the first to m-th sensor nodes SN11 to SN1m of the first sensor node column SNC1. The first to m-th sensing lines SLn1 to SLnm of the n-th sensing line group SLGn may be respectively connected to the first to m-th sensor nodes SNn1 to SNnm of the n-th sensor node column SNCn. As such, first to m-th sensing lines SLy1 to SLym of a y-th sensing line group SLGy (where y is an integer equal to or greater than 1 and equal to and less than n) may be respectively connected to first to m-th sensor nodes SNy1 to SNym of a y-th sensor node column SNCy.

Although FIG. 2 illustrates that the first to n-th bias circuits 221 to 22n are respectively connected to the first to n-th sensing line groups SLG1 to SLGn, embodiments are not limited thereto. For example, one bias circuit may be connected to two or more sensing line groups to control the two or more sensing lines groups.

The sensing signal sensor 230 may be connected to the first to n-th sensing line groups SLG1 to SLGn. The sensing signal sensor 230 may be operated in response to a sensing control signal DTCTRL received from the controller 210. The sensing signal sensor 230 may sense a change in voltage and/or current of a sensing line of a selected sensor node to sense a touch of the user. Although FIG. 2 illustrates that the sensing signal sensor 230 is a single component, embodiments are not limited thereto. For example, the sensing signal sensor 230 may be divided into two or more components, and the divided components may be connected to the first to n-th sensing line groups SLG1 to SLGn.

Figure 3:
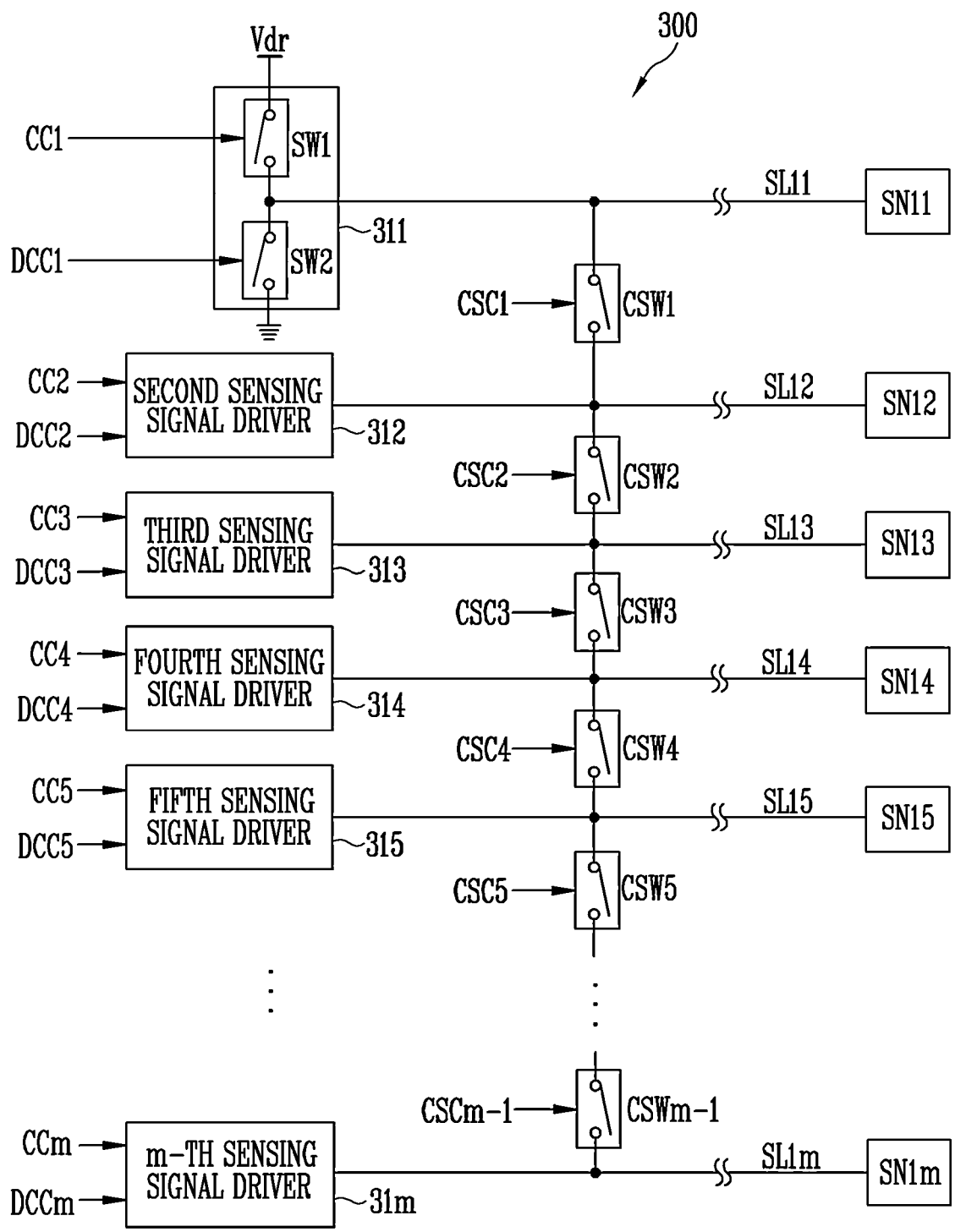
FIG. 3 is a block diagram illustrating aspects of any one of first to n-th bias circuits of FIG. 2 according to some embodiments.
Figure 4:
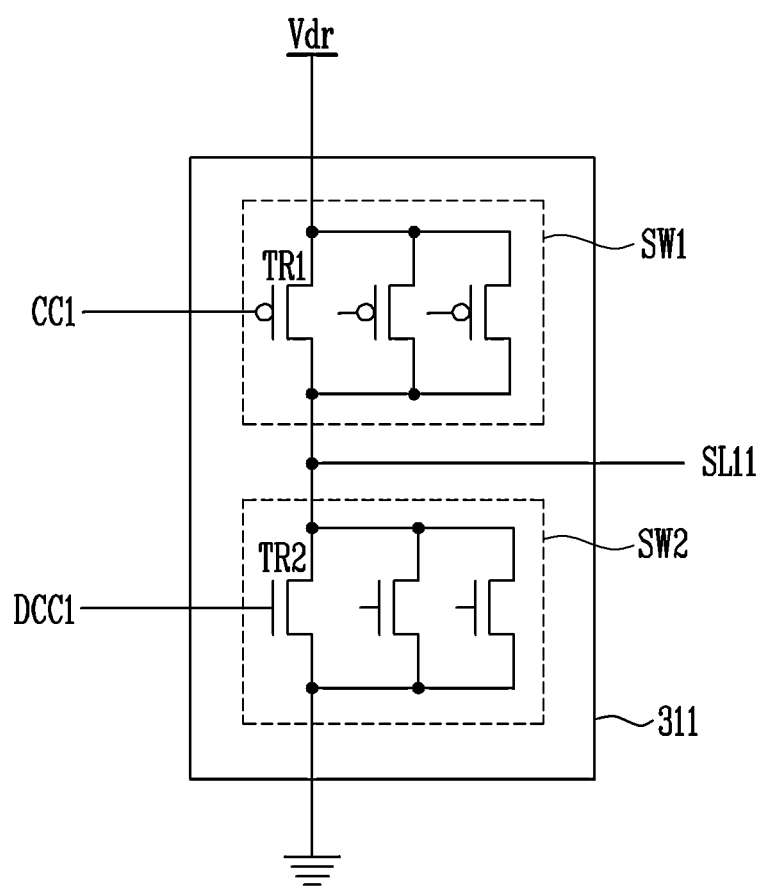
FIG. 4 is a block diagram illustrating aspects of any one of first to m-th sensing signal drivers of FIG. 3 according to some embodiments.

FIG. 3 is a block diagram illustrating aspects of any one of the first to n-th bias circuits 221~22n of FIG. 2 according to some embodiments. FIG. 4 is a block diagram illustrating aspects of any one of first to m-th sensing signal drivers of FIG. 3 according to some embodiments. FIG. 3 illustrates aspects of the first bias circuit 221 of the first to n-th bias circuits 221 to 22n of FIG. 2 according to some embodiments. Each of the second to n-th bias circuits 222 to 22n may also have the same configuration as the first bias circuit 221 of FIG. 1. Hereinafter, some repetitive explanations may be omitted.

Referring to FIG. 3, a bias circuit 300 may include first to m-th sensing signal drivers 311 to 31m, and first to m-1-th connection control switches CSW1 to CSWm-1.

The first to m-th sensing signal drivers 311 to 31m are respectively connected to the first to m-th sensing lines SL11 to SL1m. In other words, the first to m-th sensing signal drivers 311 to 31m are respectively connected to the first to m-th sensing nodes SN11 to SN1m.

Each of the first to m-th sensing signal drivers 311 to 31m may apply a driving voltage Vdr (or a driving voltage source) and a ground voltage (or a ground voltage source) to a corresponding sensing line in response to a charging control signal and a discharging control signal. The first sensing signal driver 311 may be operated in response to a first charging control signal CC1 and a first discharging control signal DCC1. The second sensing signal driver 312 may be operated in response to a second charging control signal CC2 and a second discharging control signal DCC2. The third sensing signal driver 313 may be operated in response to a third charging control signal CC3 and a third discharging control signal DCC3. The fourth sensing signal driver 314 may be operated in response to a fourth charging control signal CC4 and a fourth discharging control signal DCC4. The fifth sensing signal driver 315 may be operated in response to a fifth charging control signal CC5 and a fifth discharging control signal DCC5. The m-th sensing signal driver 31m may be operated in response to an m-th charging control signal CCm and a m-th discharging control signal DCCm.

Each of the first to m-th sensing signal drivers 311 to 31m may include a first switch SW1 and a second switch SW2. In FIG. 3, for clear and simple description, there are illustrated the first and second switches SW1 and SW2 included in the first sensing signal driver 311, and switches included in each of the second to m-th sensing signal drivers 312 to 31m are omitted. Each of the second to m-th sensing signal drivers 312 to 31m may also have the same configuration as the first sensing signal driver 311. The first and second switches SW1 and SW2 may be connected in series between the driving voltage source Vdr and the ground voltage source. The first switch SW1 is connected between the driving voltage source Vdr and the second switch SW2, and may be turned on in response to the first charging control signal CC1. The second switch SW2 is connected between the first switch SW1 and the ground voltage source, and may be turned on in response to the first discharging control signal DCC1. The first sensing line SL11 is connected to a branch node between the first and second switches SW1 and SW2.

According to some embodiments, each of the first and second switches SW1 and SW2 may include at least one transistor. FIG. 4 illustrates aspects of the first sensing signal driver 311 according to some embodiments. Referring to FIG. 4, the first switch SW1 may include one or more first transistors TR1 connected in parallel between the driving voltage source Vdr and the first sensing line SL11. At least one of the first transistors TR1 may be turned on in response to the first charging control signal CC1. The other first transistors TR1 may be turned on in response to an additional charging control signal, so that a rising edge of a pulse signal to be applied to the first sensing line SL11 may be controlled. According to some embodiments, the first transistors TR1 may be PMOS transistors. According to some embodiments, the first transistors TR1 may be NMOS transistors.

The second switches SW2 may include one or more second transistors TR2 connected in parallel between the first sensing line SL11 and the ground voltage source. At least one of the second transistors TR2 may be turned on in response to the first discharging control signal DCC1. The other second transistors TR2 may be turned on in response to an additional discharging control signal, so that a falling edge of a pulse signal to be applied to the first sensing line SL11 may be controlled. According to some embodiments, the second transistors TR2 may be NMOS transistors. According to some embodiments, the second transistors TR2 may be PMOS transistors.

Referring again to FIG. 3, each of the first to m-1-th connection control switches CSW1 to CSWm-1 may be connected between adjacent sensing lines and/or adjacent sensor nodes. The first connection control switch CSW1 may be connected between the first and second sensing lines SL11 and SL12. The second connection control switch CSW2 may be connected between the second and third sensing lines SL12 and SL13. The third connection control switch CSW3 may be connected between the third and fourth sensing lines SL13 and SL14. The fourth connection control switch CSW4 may be connected between the fourth and fifth sensing lines SL14 and SL15. The fifth connection control switch CSW5 may be connected between the fifth and sixth sensing lines SL15 and SL16. The m-1-th connection control switch CSWm-1 may be connected between the m-1-th and m-th sensing lines SL1m-1 and SL1m.

The first to m-1-th connection control switches CSW1 to CSWm-1 may respectively receive first to m-1-th charge sharing control signals CSC1 to CSCm-1. Each of the first to m-th connection control switches CSW1 to CSWm-1 may be turned on in response to a corresponding charge sharing control signal to electrically connect corresponding sensing lines adjacent to each other. According to some embodiments, each of the first to m-th connection control switches CSW1 to CSWm-1 may include at least one transistor configured to be turned on in response to a corresponding charge sharing control signal.

The first to m-th charging control signals CC1 to CCm, the first to m-th discharging control signals DCC1 to DCCm, and the first to m-1-th charge sharing control signals CSC1 to CSCm-1-th may be included in the first driving control signal DCTRL1 of FIG. 1.

Each of the first to m-th sensor nodes SN11 to SN1m may be sequentially selected to sense a touch of the user. Hereinafter, for convenience of explanation, it is assumed that the third sensor node SN13 is selected.

The third sensing signal driver 313 may apply a target pulse signal to the third sensor node SN13 as the third sensing signal SS3 of FIG. 1. The target pulse signal may be changed in various ways depending on embodiments. The target pulse signal may include a pulse signal which toggles between a first target voltage level and a second target voltage level.

A first pulse signal may be applied to the second sensor node SN12 adjacent to the third sensor node SN13 as the second sensing signal SS2 of FIG. 1. The foregoing may be performed by the second sensing signal driver 312 and the first connection control switch CSW1, as will be described below. According to some embodiments, the first pulse signal may have a waveform similar to that of the target pulse signal. For example, the first pulse signal may have substantially the same phase as the target pulse signal. Hence, an appropriate mutual capacitance may be formed between the second sensor node SN12 and the third sensor node SN13. The target pulse signal of the third sensor node SN13 may vary depending on the mutual capacitance and a capacitance corresponding to the touch of the user. The sensing signal sensor 230 of FIG. 2 may sense the touch of the user in response to the target pulse signal.

A second pulse signal may be applied to the first sensor node SN11 adjacent to the second sensor node SN12 as the first sensing signal SS1 (refer to FIG. 1). The second pulse signal may have a polarity reverse to that of the first pulse signal. Hence, the second pulse signal may offset EMI derived from the first pulse signal.

The application of the second pulse signal may be performed by the first sensing signal driver 311 and the first connection control switch CSW1, as will be described below. The voltage levels of the first and second pulse signals may be adjusted by at least temporarily turning on the first connection control switch CSW1. For example, when the first pulse signal has a high level and the second pulse signal has a low level, the first connection control switch CSW1 may be turned on so that the first and second pulse signals can have an identical intermediate voltage level. Thereafter, the first sensing signal driver 311 may adjust the voltage level of the first pulse signal to a low level, and the second sensing signal driver 312 may adjust the voltage level of the second pulse signal to a high level. In this way, the first and second pulse signals may have polarities reverse to each other, and may toggle between the high level and the low level. Adjusting the voltage levels of the first and second pulse signals by turning on the first connection control switch CSW1 may mean that usage of the driving voltage Vdr used to provide the first and second pulse signals can be comparatively reduced. Hence, the time it takes to use (or apply) the driving voltage Vdr to generate the first and second pulse signals may be reduced, and an electric field resulting from the application of the driving voltage Vdr may be reduced. Consequently, EMI caused by the first and second pulse signals can be mitigated.

The fourth sensor node SN14 is adjacent to the third sensor node SN13 without another sensor node interposed therebetween. The fifth sensor node SN15 is adjacent to the fourth sensor node SN14. In the case where the third sensor node SN13 is selected, the fourth and fifth sensor nodes SN14 and SN15 may be controlled in substantially the same manner as the second and first sensor nodes SN12 and SN11. The first pulse signal may be applied to the fourth sensor node SN14 as the fourth sensing signal SS4 of FIG. 1. The second pulse signal having a polarity reverse to that of the first pulse signal may be applied to the fifth sensor node SN15 as the fifth sensing signal SS5 of FIG. 1. The voltage levels of the first and second pulse signals may be adjusted by at least temporarily turning on the fourth connection control switch CSW4.

According to some embodiments, the number of sensor nodes (e.g., SN11 and SN15) to which the second pulse signal is to be applied may be the same as the number of sensor nodes (e.g., SN12 and SN14) to which the first pulse signal is to be applied. In this case, EMI caused by the first pulse signal may be effectively reduced by the second pulse signal. However, embodiments are not limited the foregoing. The number of sensor nodes to which the second pulse signal is to be applied may be different from the number of sensor nodes to which the first pulse signal is to be applied.

Figure 5:
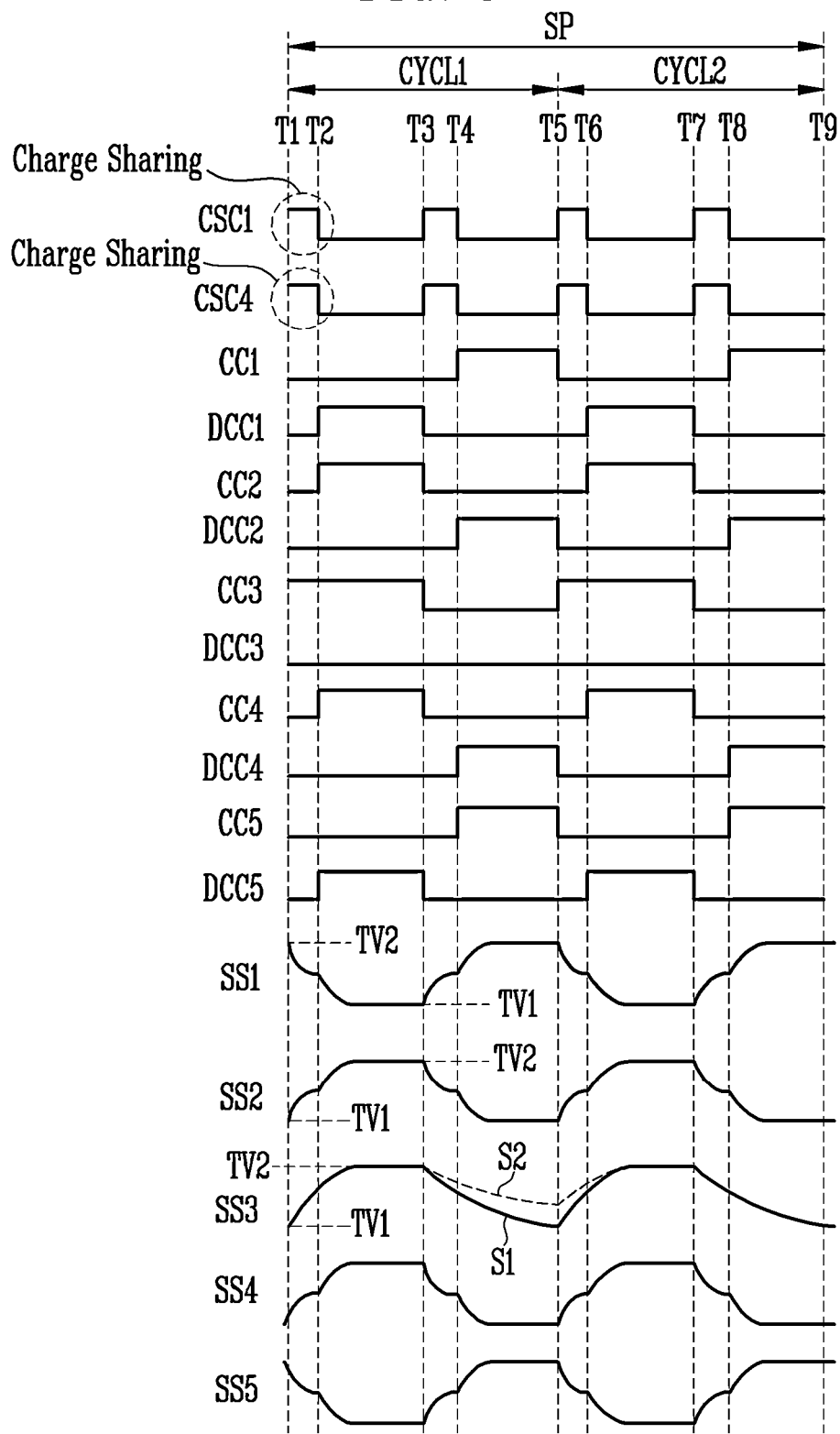
FIG. 5 is a timing diagram illustrating aspects of some of the signals of FIG. 3 when whether a touch of a user is present is sensed through a third sensor node according to some embodiments.
Figure 6:
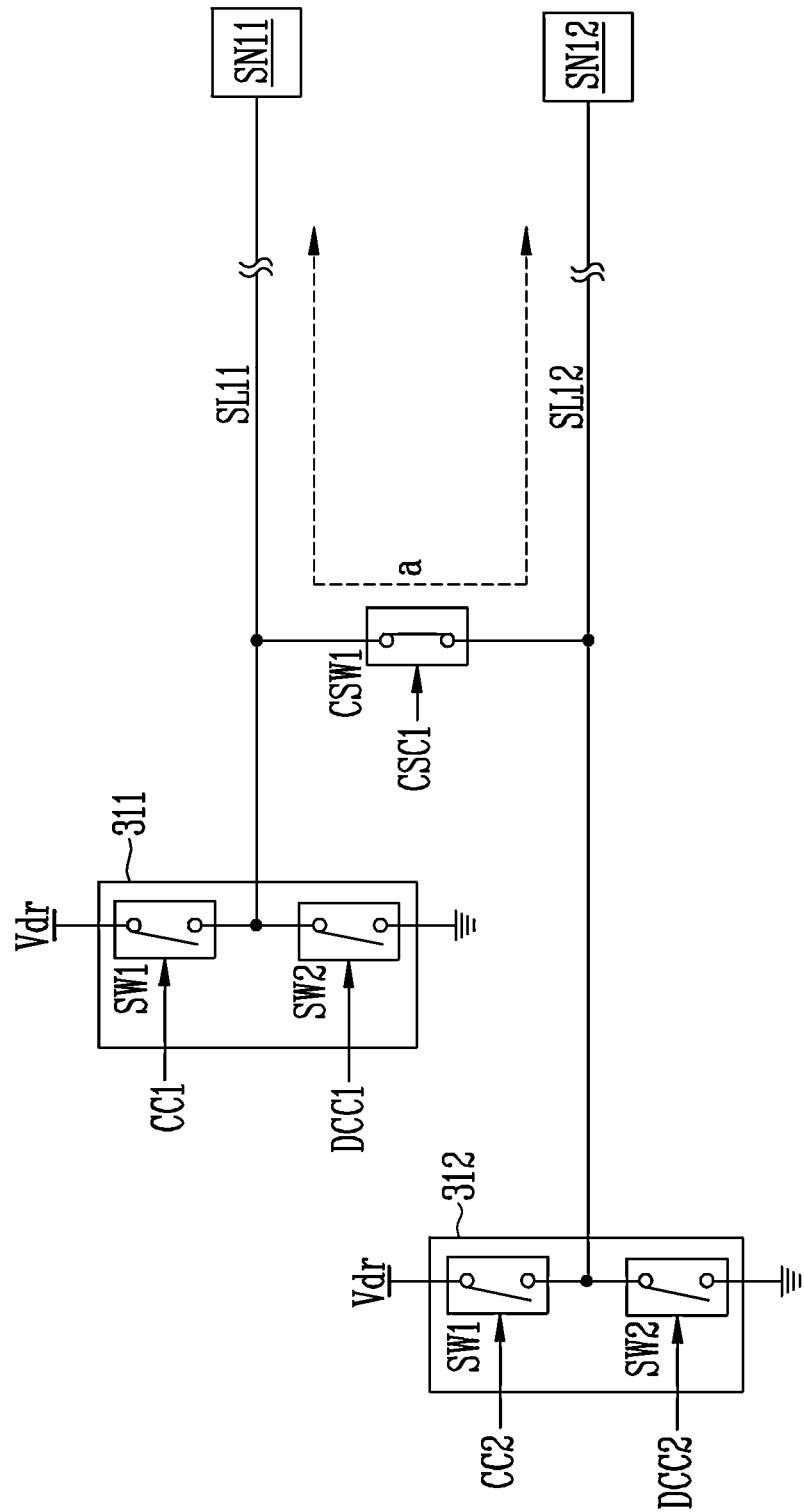
FIGS. 6 and 7 are diagrams for describing current paths related to first and second sensing lines between first to third time points of FIG. 5 according to some embodiments.
Figure 7:
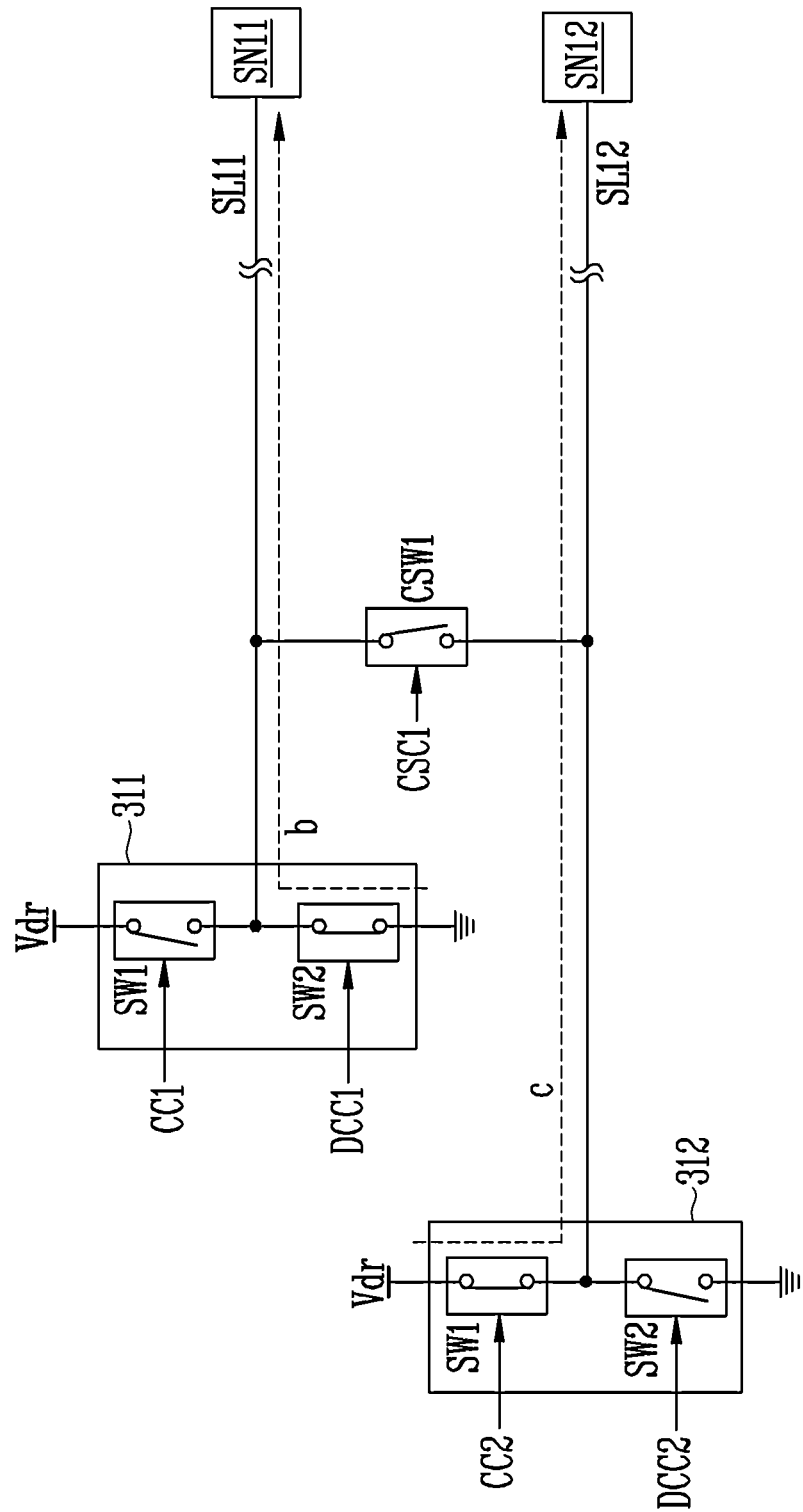
Figure 8:
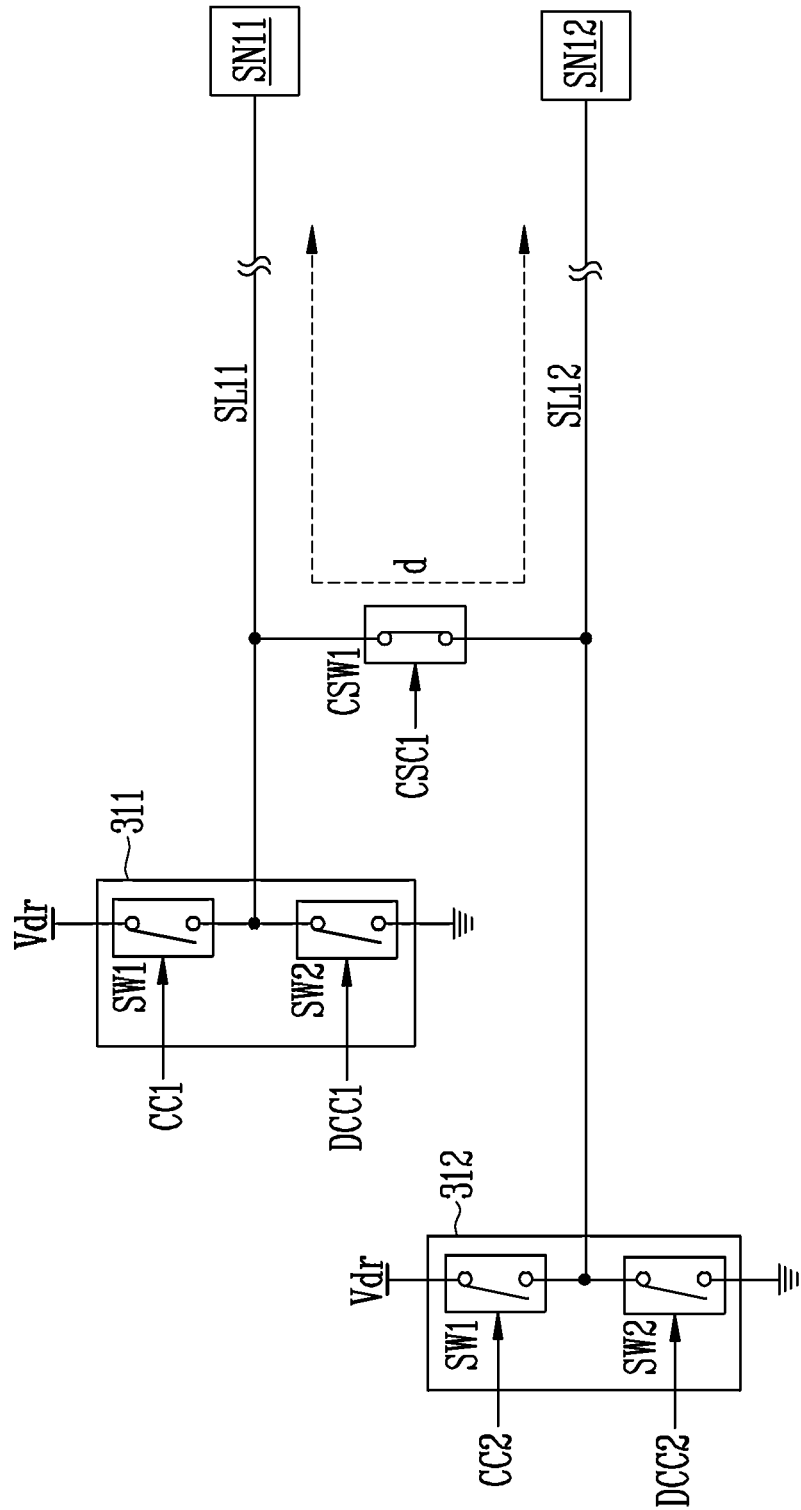
FIGS. 8 and 9 are diagrams for describing current paths related to the first and second sensing lines between third to fifth time points of FIG. 5 according to some embodiments.
Figure 9:
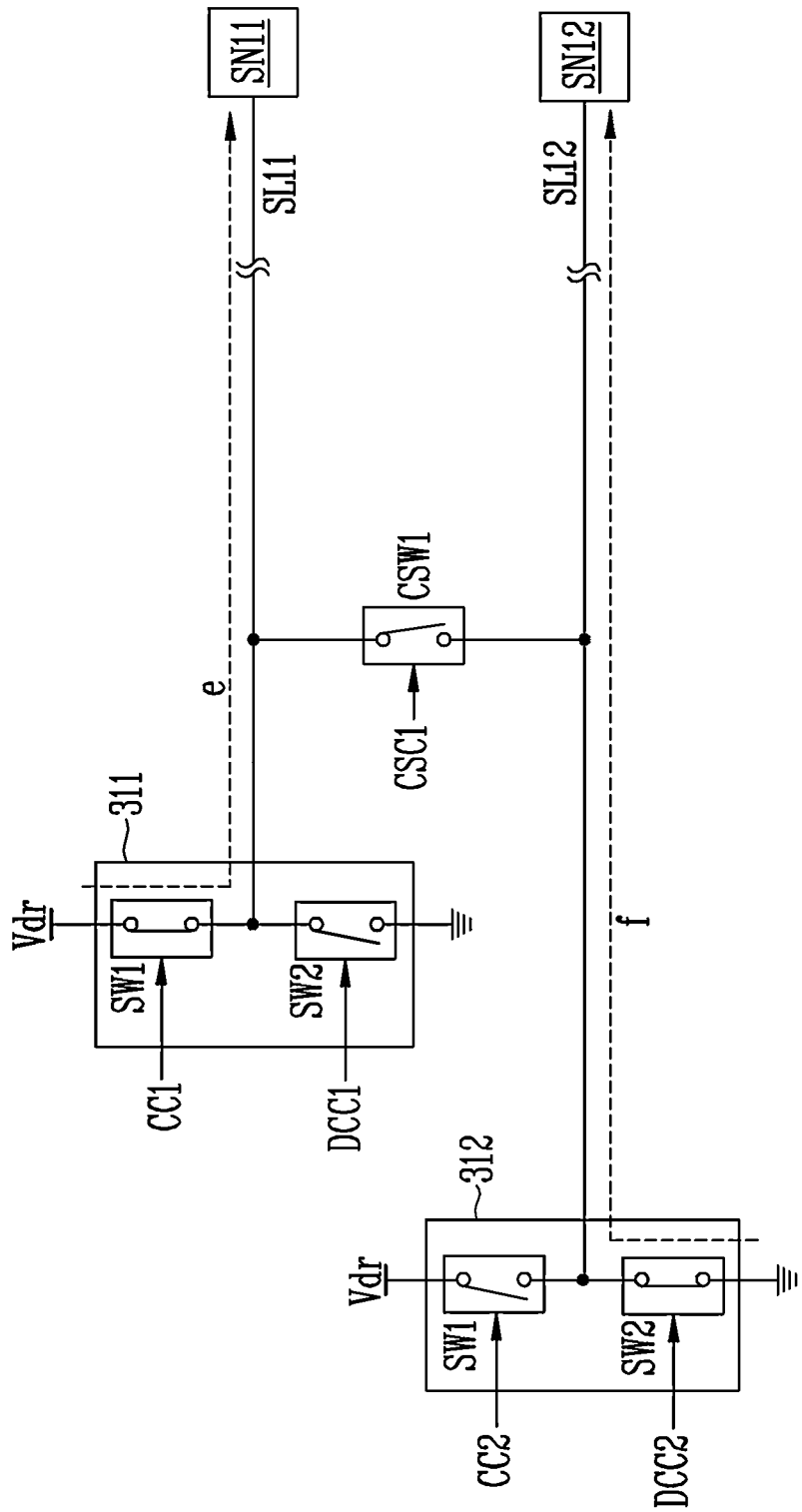

FIG. 5 is a timing diagram illustrating an some of the signals of FIG. 3 when whether a touch of a user is present is sensed through a third sensor node according to some embodiments. FIGS. 6 and 7 are diagrams for describing current paths related to the first and second sensing lines between first to third time points of FIG. 5. FIGS. 8 and 9 are diagrams for describing the current paths related to the first and second sensing lines between third to fifth time points of FIG. 5.

In the following description with reference to FIGS. 3 and 5, for convenience of explanation, it is assumed that a charging control signal, a discharging control signal, and a charge sharing control signal each is enabled to a high level to turn on a corresponding switch. However, embodiments are not limited the foregoing. At least some of the charging control signal, the discharging control signal, and the charge sharing control signal may be enabled to a low level to turn on the corresponding switch depending on the configuration of the corresponding switch.

Referring to FIGS. 3 and 5, during a sensing period SP, the third sensor node SN13 is selected to determine whether the user's body is adjacent to the third sensor node SN13. As such, during each of a plurality of sensing periods, at least one sensor node may be selected to sense a touch of the user.

At a first time point T1, the third sensing signal SS3 of the third sensing line SL13 may have a first target voltage level TV1. The third charging control signal CC3 is enabled, and the third sensing signal SS3 makes a transition from the first target voltage level TV1 to a second target voltage level TV2. For example, the first and second target voltage levels TV1 and TV2 may be respectively 0 V and 5 V.

The second sensing signal SS2 of the second sensing line SL12 may have a first target voltage level TV1. The first sensing signal SS1 of the first sensing line SL11 may have a second target voltage level TV2.

The first charge sharing control signal CSC1 is enabled. Hence, the voltage level of the second sensing signal SS2 may increase, and the voltage level of the first sensing signal SS1 may decrease. For example, the first and second sensing signals SS1 and SS2 may have the same voltage level. Referring to FIG. 6, when the first charge sharing control signal CSC1 is enabled, the first connection control switch CSW1 may be turned on, so that the first and second sensing lines SL11 and SL12 can be electrically connected to each other, as indicated by a current path a, and thus can share charges.

Referring again to FIG. 5, the fourth charge sharing control signal CSC4 is enabled. The fourth sensing signal SS4 and the fifth sensing signal SS5 may be changed in the same manner as the second sensing signal SS2 and the first sensing signal SS1.

At a second time point T2, the first charge sharing control signal CSC1 is disabled, and the first discharging control signal DCC1 and the second charging control signal CC2 are enabled. Hence, the voltage level of the second sensing signal SS2 may further increase and reach the second target voltage level TV2, and the voltage level of the first sensing signal SS1 may further decrease and reach the first target voltage level TV1. Referring to FIG. 7, the first connection control switch CSW1 is turned off, and the second switch SW2 of the first sensing signal driver 311 and the first switch SW1 of the second sensing signal driver 312 are turned on. Hence, as indicated by a current path b, the first sensing line SL11 is connected to the ground voltage source, thus having a first target voltage level TV1. The second sensing line SL12 is connected to the driving voltage source Vdr, as indicated by a current path c, thus having a second target voltage level TV2.

Referring again to FIG. 5, the fourth charge sharing control signal CSC4 is disabled, and the fourth charging control signal CC4 and the fifth discharging control signal DDC5 are enabled. Hence, the fourth sensing signal SS4 and the fifth sensing signal SS5 may be changed in the same manner as the second sensing signal SS2 and the first sensing signal SS1.

At a third time point T3, the third charging control signal CC3 is disabled. The third discharging control signal DCC3 remains disabled. Hence, the voltage level of the third sensing signal SS3 may gradually decrease. For example, the voltage level of the third sensing signal SS3 may gradually decrease as the voltage levels of the second and fourth sensing signals SS2 and SS4 decrease. A slope of the voltage level of the third sensing signal SS3 may be changed depending on the touch of the user. For example, in the case where the touch of the user is not adjacent to the third sensor node SN13, the voltage level of the third sensing signal SS3 may have a first slope S1. In the case where the touch of the user is adjacent to the third sensor node SN13, the voltage level of the third sensing signal SS3 may have a second slope S2. The sensing signal sensor 230 of FIG. 2 may sense the touch of the user depending on whether the third sensing signal SS3 has the first slope S1 or the second slope S2.

The first discharging control signal DCC1 and the second charging control signal CC2 are disabled, and the first charge sharing control signal CSC1 is enabled. Hence, the voltage level of the second sensing signal SS2 may decrease, and the voltage level of the first sensing signal SS1 may increase. Referring to FIG. 8, when the first charge sharing control signal CSC1 is enabled, the first connection control switch CSW1 may be turned on, so that the first and second sensing lines SL11 and SL12 can be electrically connected to each other, as indicated by a current path d, and thus can have the same voltage level. As such, due to the charge sharing between the first and second sensing lines SL11 and SL12, the voltage level of the first sensing signal SS1 increases and the voltage level of the second sensing signal SS2 decreases.

Referring again to FIG. 5, the fourth charging control signal CC4 and the fifth discharging control signal DCC5 are disabled, and the fourth charge sharing control signal CSC4 is enabled. Hence, due to the charge sharing between the fourth and fifth sensing lines SL14 and SL15, the voltage level of the fourth sensing signal SS4 decreases, and the voltage level of the fifth sensing signal SS5 increases.

At a fourth time point T4, the first charge sharing control signal CSC1 is disabled, and the first charging control signal CC1 and the second discharging control signal DCC2 are enabled. Hence, the voltage level of the second sensing signal SS2 may further decrease and reach the first target voltage level TV1, and the voltage level of the first sensing signal SS1 may further increase and reach the second target voltage level TV2. Referring to FIG. 9, the first connection control switch CSW1 is turned off, and the first switch SW1 of the first sensing signal driver 311 and the second switch SW2 of the second sensing signal driver 312 are turned on. Hence, as indicated by a current path e, the first sensing line SL11 is connected to the driving voltage source Vdr and thus has a second target voltage level TV2, and the second sensing line SL12 is connected to the ground voltage source and thus has a first target voltage level TV1.

Referring again to FIG. 5, the fourth charge sharing control signal CSC4 is disabled, and the fourth discharging control signal DCC4 and the fifth charging control signal CC5 are enabled. Hence, the fourth sensing signal SS4 and the fifth sensing signal SS5 may be respectively changed in the same manner as the second sensing signal SS2 and the first sensing signal SS1, so that the fourth sensing signal SS4 may have a first target voltage level TV1, and the fifth sensing signal SS5 may have a second target voltage level TV2.

At a fifth time point T5, the first charging control signal CC1 and the second discharging control signal DCC2 are disabled. The fourth discharging control signal DCC4 and the fifth charging control signal CC5 are disabled.

A period of time between the first and fifth time points T1 and T5 may be defined as a first time cycle CYCL1.

As such, when a target pulse signal is applied to the third sensing signal SS3, first pulse signals each having a waveform similar to that of the target pulse may be applied to the second and fourth sensing signals SS2 and SS4, and second pulse signals having a polarity reverse to that of the first pulse signals may be applied to the first and fifth sensing signals SS1 and SS5. The first pulse signals and the second pulse signals may toggle between the first and second target voltage levels TV1 and TV2. Here, during a period of time between the first and second time points T1 and T2 and a period of time between the third and fourth time points T3 and T4, the first and second sensing lines SL11 and SL12 are electrically connected to each other and thus share charges, and the fourth and fifth sensing lines SL14 and SL15 are electrically connected to each other and thus share charges.

Operations at the fifth time point T5, a sixth time point T6, a seventh time point T7, and an eighth time point T8 may be described in the same manner as the operations at the first time point T1, the second time point T2, the third time point T3, and the fourth time point T4. At a ninth time point T9, the sensing period SP is terminated.

A period of time between the fifth and ninth time points T5 and T9 may be defined as a second time cycle CYCL2 following the first time cycle CYCL1. As such, the sensing period SP includes one or more time cycles CYCL1 and CYCL2, and allows a touch of the user to be sensed through a selected sensing node.

Figure 10:
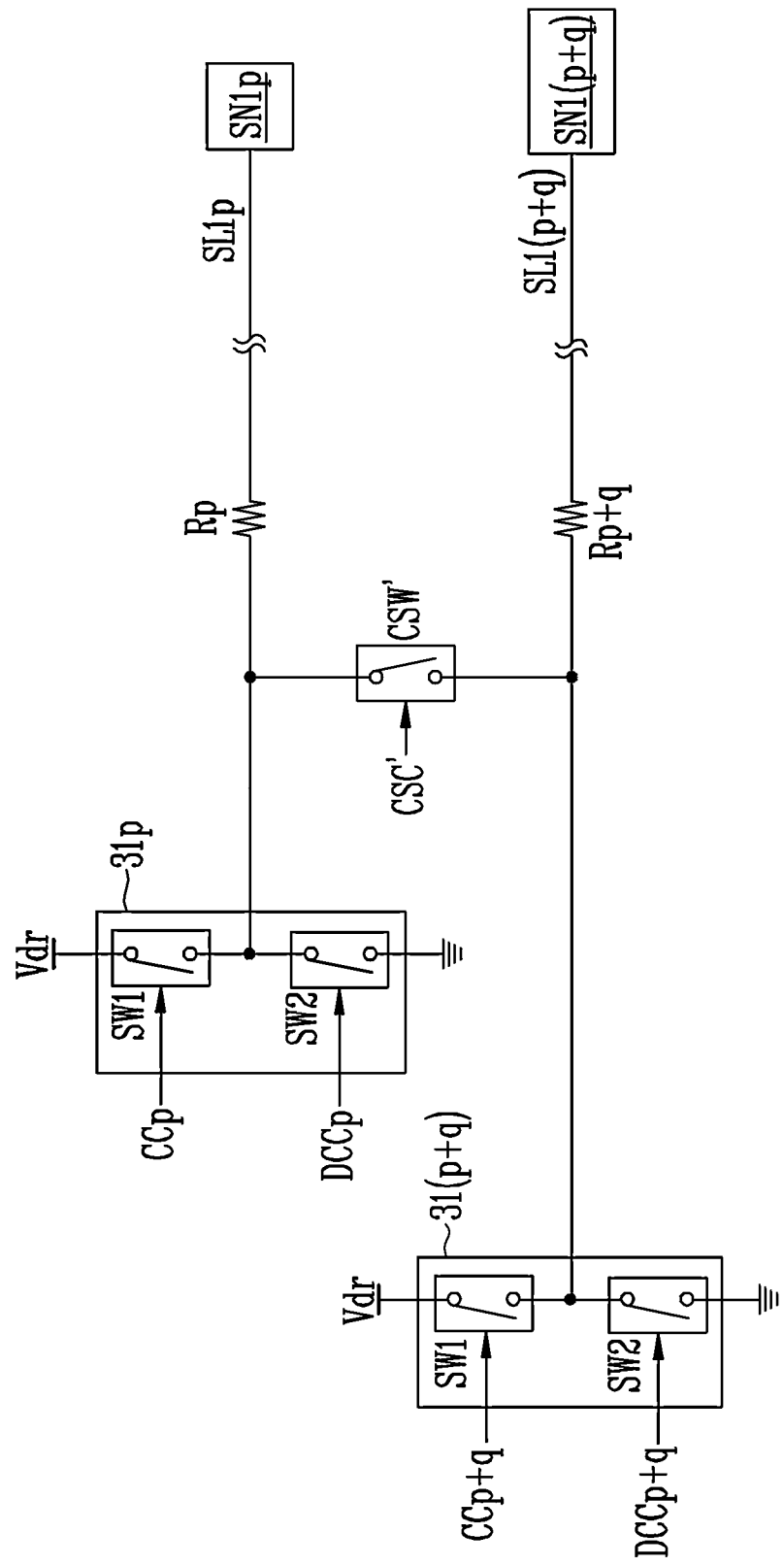
FIG. 10 is a block diagram illustrating aspects of a connection control switch which may be further included in a bias circuit of FIG. 3 according to some embodiments.

FIG. 10 is a block diagram illustrating a connection control switch that may be further included in the bias circuit 300 of FIG. 3 according to some embodiments.

The bias circuit 300 of FIG. 3 may include an additional connection control switch in addition to the first to m-1-th connection switches CSW1 to CSWm-1 of FIG. 3.

Referring to FIG. 10, a p-th sensing signal driver 31$p$ (where p is an integer equal to or greater than 1 and equal to or less than m) is connected to a p-th sensor node SN1$p$ through a p-th sensing line SL1p. The first switch SW1 and the second switch SW2 of the p-th sensing signal driver 31$p$ may be respectively turned on in response to a p-th charging control signal CCp and a p-th discharging control signal DCCp.

A p+q-th sensing signal driver 31(p+q) is connected to a p+q-th sensor node SN1(p+q) through a p+q-th sensing line SL1(p+q) (where q is an integer equal to or greater than 2, and p+q is an integer greater than p and equal to or less than m). The first switch SW1 and the second switch SW2 of the p+q-th sensing signal driver 31(p+q) may be respectively turned on in response to a p+q-th charging control signal CCp+q and a p+q-th discharging control signal DCCp+q.

According to some embodiments, there may be further provided a p-th resistor Rp connected between the p-th sensing line SL1$p$ and the p-th sensing signal driver 31p, and a p+q-th resistor Rp+q connected between the p+q-th sensing line SL1(p+q) and the p+q-th sensing signal driver 31(p+q). As such, the bias circuit 300 may further include a resistor configured to adjust an impedance of each sensing line.

There may be provided a connection control switch CSW' connected between the p-th sensing line SL1$p$ and the p+q-th sensing line SL1(p+q). The connection control switch CSW' may be turned on in response to a charge sharing control signal CSC'.

Charge sharing between the p-th sensor node SN1$p$ and the p+q-th sensor node SN1(p+q) may be performed through the connection control switch CSW'. Here, the p-th sensor node SN1$p$ and the p+q-th sensor node SN1(p+q) are spaced apart from each other with another sensor node interposed therebetween.

According to some embodiments, when a first pulse signal is applied to the p-th sensor node SN1p, a second pulse signal having a polarity reverse to that of the first pulse signal may be applied to the p+q-th sensor node SN1(p+q) rather than to a sensor node (e.g., SN1(p+1)) adjacent to the p-th sensor node SN1p. Here, a selected sensor node to which a target pulse signal is applied may be, for example, a p−1-th sensor node SN1(p−1). In this case, as described with reference to FIG. 5, during a portion of a period of time for which the first and second pulse signals make transitions, the p-th sensor node SN1$p$ and the p+q-th sensor node SN1(p+q) may be electrically connected to each other through the connection control switch CSW'. According to some embodiments, when a first pulse signal is applied to the p+q-th sensor node SN1(p+q), a second pulse signal may be applied to the p-th sensor node SN1$p$ rather than to a sensor node (e.g., SN1(p+q−1)) adjacent to the p+q-th sensor node SN1(p+q). Here, a selected sensor node to which a target pulse signal is applied may be, for example, a p+q+1-th sensor node SN1(p+q+1). In this case, during a portion of a period of time for which the first and second pulse signals make transitions, the p-th sensor node SN1$p$ and the p+q-th sensor node SN1(p+q) may also be electrically connected to each other through the connection control switch CSW'. As such, the second pulse signal may be applied to a sensor node which is not adjacent to the sensor node to which the first pulse signal is applied. Here, during a portion of a period of time for which the first and second pulse signals make transitions, the corresponding sensor nodes may share charges with each other.

According to some embodiments, the connection control switch CSW' may function to allow the selected sensor node to which the target pulse signal is applied to share charges with another sensor node. The foregoing will be described in more detail with reference to FIG. 11.

Figure 11:
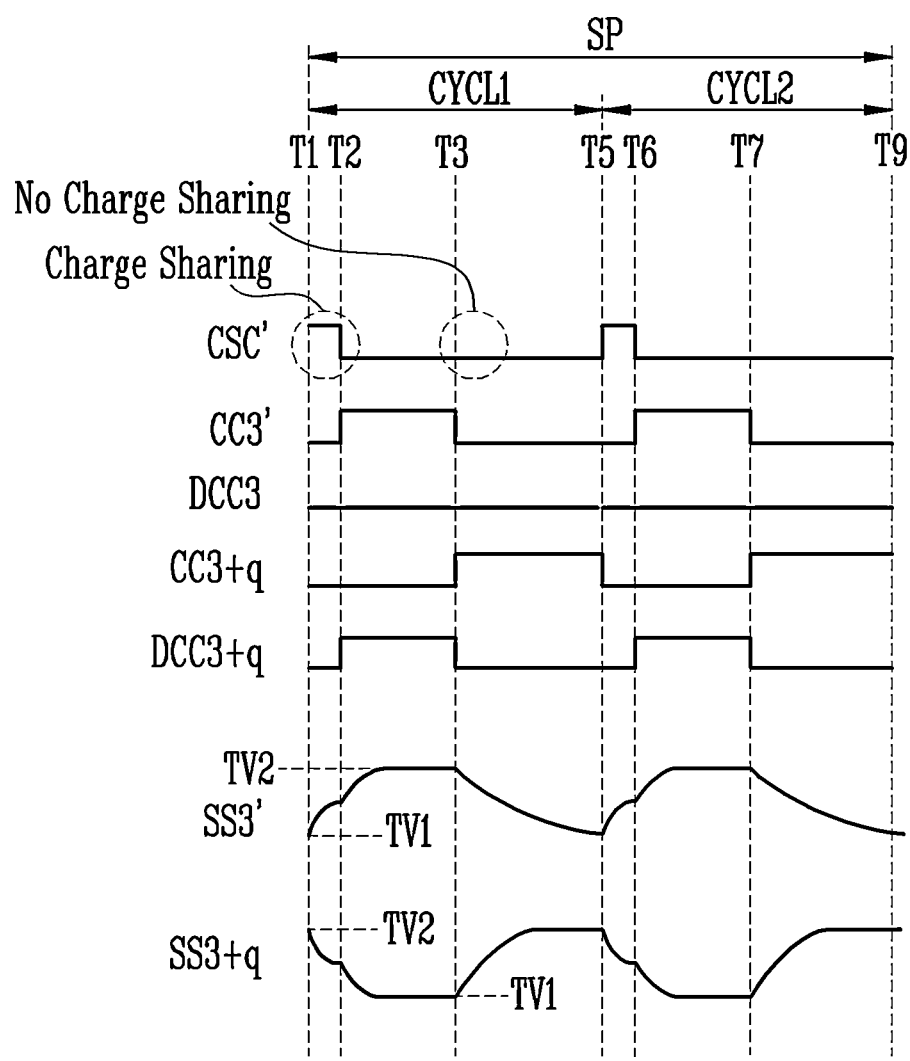
FIG. 11 is a timing diagram illustrating aspects of signals of FIG. 10 when a target pulse signal is applied to a third sensor node to sense whether a touch of the user is present according to some embodiments.

FIG. 11 is a timing diagram illustrating the signals of FIG. 10 when the target pulse signal is applied to the third sensor node to sense whether a touch of the user is present according to some embodiments. In the following description with reference to FIG. 11, it is assumed that p of FIG. 10 is 3. In other words, the p-sensor node SN1$p$ of FIG. 10 may be the third sensor node SN13 (refer to FIG. 3).

When whether the touch of the user is present is sensed through the third sensor node SN13, the third charging control signal CC3 and the third sensing signal SS3 of FIG. 5 may be changed to a third charging control signal CC3' and a third sensing signal SS3' of FIG. 11. The other signals of FIG. 5 may be provided in the same form. The first, second, fourth, and fifth sensing signals SS1, SS2, SS4, and SS5, the first and fourth charge sharing control signals CSC1 and CSC4, the first charging control signal CC1, the first discharging control signal DCC1, the second charging control signal CC2, the second discharging control signal DCC2, the fourth charging control signal CC4, the fourth discharging control signal DCC4, the fifth charging control signal CC5, and the fifth discharging control signal DCC5 may be configured in the same manner as those of FIG. 5. Hence, a first pulse signal may be applied to the second and fourth sensor nodes SN12 and SN14, and a second pulse signal having a polarity reverse to that of the first pulse signal may be applied to the first and fifth sensor nodes SN11 and SN15.

Referring to FIGS. 3, 10, and 11, at a first time point T1, the third sensing signal SS3' has a first target voltage level TV1, and a 3+q sensing signal SS3+q has a second target voltage level TV2. q is an integer equal to or greater than 3 and equal to or less than m.

The charge sharing control signal CSC' is enabled. Hence, the connection control switch CSW' may be turned on so that the third sensing line SL13 and the 3+q-th sensing line SL1(3+q) may be electrically connected to each other. The voltage level of the third sensing signal SS3' may increase, and the voltage level of the 3+q-th sensing signal SS3+q may decrease. For example, the third sensing signal SS3' and the 3+q-th sensing signal SS3+q may have the same voltage level. As such, due to the charge sharing between the third sensing line SL13 and the 3+q-th sensing line SL1(3+q), the voltage level of the third sensing signal SS3' may increase, and the voltage level of the 3+q-th sensing signal SS3+q may decrease.

At a second time point T2, the charge sharing control signal CSC' is disabled, and the third charging control signal CC3' and the 3+q-th discharging control signal DCC3+q are enabled. Hence, the voltage level of the third sensing signal SS3' may further increase and reach a second target voltage level TV2, and the voltage level of the 3+q-th sensing signal SS3+q may further decrease and reach a first target voltage level TV1.

At a third time point T3, the third charging control signal CC3' is disabled. The third discharging control signal DCC3 remains disabled. Hence, the voltage level of the third sensing signal SS3' may gradually decrease. A falling slope of the voltage level of the third sensing signal SS3' may be changed depending on the touch of the user. The touch of the user may be sensed based on the voltage level of the third sensing signal SS3'.

If the charge sharing control signal CSC' is enabled during a period of time for which the voltage level of the third sensing signal SS3' gradually decreases, the third sensing line SL13 and the 3+q-th sensing line SL1(3+q) may be electrically connected to each other. In this case, a falling slope of the voltage level of the third sensing signal SS3' may not reflect the touch of the user. During the period of time for which the voltage level of the third sensing signal SS3' gradually decreases, the charge sharing control signal CSC' may not be enabled. During the period of time for which the voltage level of the third sensing signal SS3' gradually decreases, the third sensing line SL13 and the 3+q-th sensing line SL1(3+q) may not share charges.

The 3+q-th discharging control signal DCC3+q is disabled, and the 3+q-th charging control signal CC3+q is enabled. Hence, the 3+q-th sensing signal SS3+q may make a transition from the first target voltage level TV1 to the second target voltage level TV2.

At a fifth time point T5, the 3+q-th charging control signal CC3+q is disabled.

A period of time between the first and fifth time points T1 and T5 may be defined as a first time cycle CYCL1, as described with reference to FIG. 5.

As such, the 3+q-th sensing signal SS3+q may make a transition from the second target voltage level TV2 to the first target voltage level TV1 when the third sensing signal SS3' makes a transition from the first target voltage level TV1 to the second target voltage level TV2. While the voltage level of the third sensing signal SS3' gradually decreases from the second target voltage level TV2, the 3+q-th sensing signal SS3+q may make a transition from the first target voltage level TV1 to the second target voltage level TV2. For example, the 3+q-th sensing signal SS3+q may have a waveform similar to that of a signal formed by inverting the third sensing signal SS3'. Hence, the 3+q-th sensing signal SS3+q may offset EMI resulting from the third sensing signal SS3'.

Furthermore, during a period of time between the first time point T1 and the second time point T2, the third sensing line SL13 and the 3+q-th sensing line SL1(3+q) may be electrically connected to each other and thus may share charges with each other. Hence, the time needed to use the driving voltage Vdr to generate the third sensing signal SS3' and the 3+q-th sensing signal SS3+q may be reduced, so that an electric field resulting from the use of the driving voltage Vdr can be reduced. Therefore, EMI which is caused by the third sensing signal SS3' and the 3+q-th sensing signal SS3+q may be reduced.

Operations at the fifth time point T5, a sixth time point T6, and a seventh time point T7 may be respectively described in the same manner as the operations at the first time point T1, the second time point T2, and the third time point T3. At a ninth time point T9, the sensing period SP is terminated. A period of time between the fifth and ninth time points T5 and T9 may be defined as a second time cycle CYCL2 following the first time cycle CYCL1.

Figure 12:
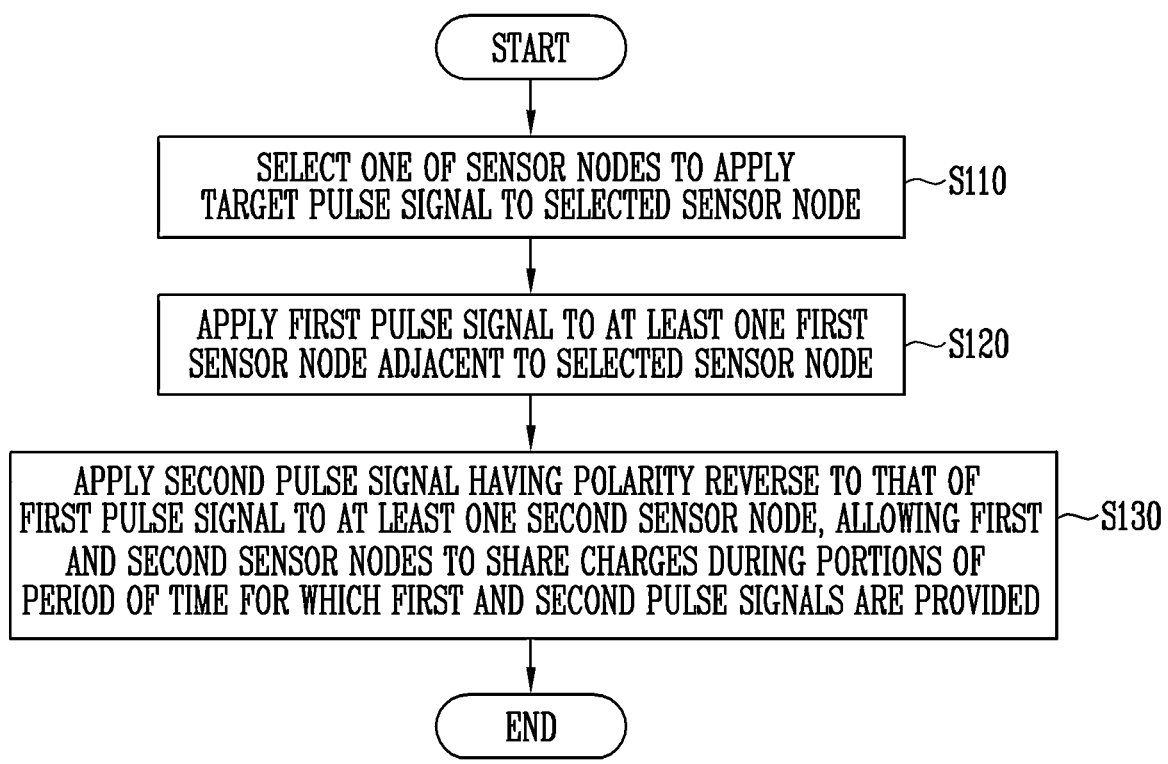
FIG. 12 is a flowchart illustrating aspects of a method of operating the sensor device for controlling sensor nodes to detect a touch of the user according to some embodiments.

FIG. 12 is a flowchart illustrating aspects of a method of operating the sensor device for controlling the sensor nodes to detect a touch of the user according to some embodiments.

Referring to FIGS. 1 and 12, at step S110, at least one of the sensor nodes SN11~SN1m, SN21~SN2m, . . . , SNn1~SNnm of the sensor array 110 is selected, and a target pulse signal is applied to the selected sensor node. According to some embodiments, each of the sensor nodes SN11~SN1m, SN21~SN2m, . . . , SNn1~SNnm may be sequentially selected. According to some embodiments, a sensor node may be selected from each of the first to n-th sensor node columns SNC1 to SNCn. In this case, n sensor nodes are simultaneously selected. According to some embodiments, column groups each including two or more sensor node columns may be defined, and a sensor node may be selected from each of the defined column groups.

The target pulse signal may toggle between a low voltage level (e.g., TV1 of FIG. 5) and a high voltage level (e.g., TV2 of FIG. 5). The target pulse signal may make a transition from a low voltage level to a high voltage level by charging the sensor node. The target pulse signal may be gradually reduced from a high voltage level without discharging the sensor node. For example, the voltage level of the selected sensor node may be gradually reduced according to capacitance with the first sensor node to which a first pulse signal is to be applied.

At step S120, when a target pulse signal is applied to the selected sensor node, the first pulse signal is applied to at least one first sensor node adjacent to the selected sensor node. The first pulse signal may have a waveform similar to that of the target pulse signal. According to some embodiments, the first pulse signal may have substantially the same phase as that of the target pulse signal. When the target pulse signal makes a transition from a low voltage level to a high voltage level, the first pulse signal may make a transition from a low voltage level to a high voltage level. As the voltage level of the target pulse signal gradually decreases from a high voltage level, the first pulse signal may make a transition from a high voltage level to a low voltage level.

A slope of the gradually decreasing voltage level of the target pulse signal may vary depending on the touch of the user. For example, in the case where a touch of the user is not inputted, the voltage level of the target pulse signal may comparatively rapidly decrease. In the case where a touch of the user is inputted, the voltage level of the target pulse signal may comparatively smoothly decrease. The touch of the user may be detected by sensing the slope of the voltage level of the target pulse signal.

At step S130, when the first pulse signal is applied to the first sensor node, a second pulse signal having a polarity reverse to that of the first pulse signal is applied to at least one second sensor node. Hence, the second pulse signal may offset EMI derived from the first pulse signal. According to some embodiments, the second sensor node may be adjacent to the first sensor node. According to some embodiments, the second sensor node may be spaced apart from the first sensor node with at least one other sensor node interposed therebetween.

During portions of a period of time for which the first and second pulse signals are provided, the first and second sensor nodes are controlled to share charges with each other. As described with reference to FIGS. 3 and 5, as a connection control switch (e.g., any one of CSW1 to CSWm-1 of FIG. 3) connected between the first sensor node and the second sensor node is controlled, the first and second sensor nodes may be electrically connected to each other. Hence, the time needed to use a driving voltage to generate the first and second pulse signals may be reduced, so that an electric field resulting from the use of the driving voltage can be reduced. Consequently, EMI caused by the first and second pulse signals can be further mitigated.

According to some embodiments, the number of at least one second sensor nodes to which the second pulse signal is applied may be the same as the number of at least one first sensor nodes to which the first pulse signal is applied. In this case, EMI caused by the first and second pulse signals can be more effectively mitigated.

According to some embodiments, the second sensor node may be adjacent to the first sensor node. For example, the second sensor node may be adjacent to the first sensor node without a sensor node interposed therebetween.

Figure 13:
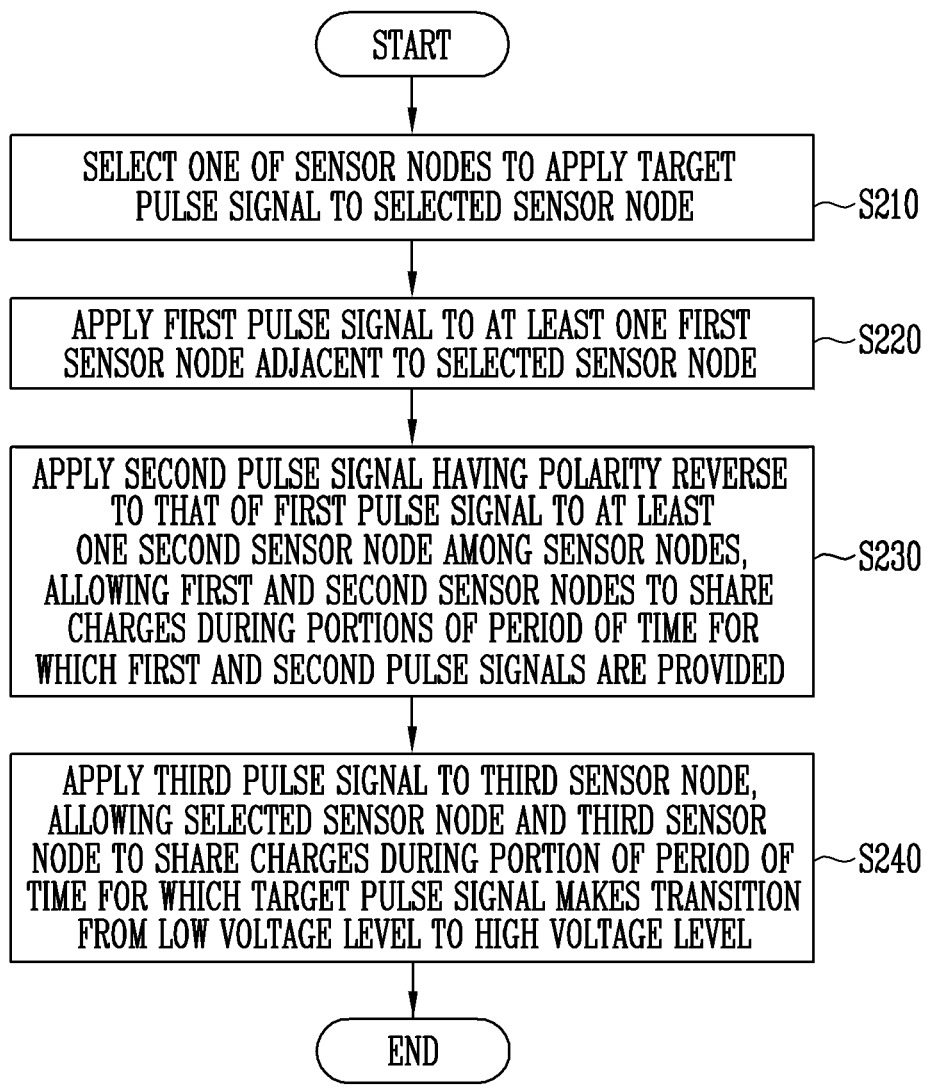
FIG. 13 is a flowchart illustrating aspects of a method of operating the sensor device for controlling sensor nodes to detect a touch of the user according to some embodiments.

FIG. 13 is a flowchart illustrating a method of operating the sensor device for controlling the sensor nodes to detect a touch of the user according to some embodiments.

Steps S210, S220, and S230 may be described in the same manner as steps S110, S120, and S130 of FIG. 12. Hereinafter, repetitive explanations will be omitted.

At step S240, a third pulse signal having a waveform similar to that of a signal formed by inverting a target pulse signal is applied to the third sensor node. According to some embodiments, when the target pulse signal makes a transition from a low voltage level to a high voltage level, the third pulse signal may make a transition from a high voltage level to a low voltage level. As the voltage level of the target pulse signal gradually decreases from a high voltage level, the third pulse signal may make a transition from a low voltage level to a high voltage level. According to some embodiments, the third pulse signal may be a signal formed by inverting the target pulse signal. Hence, the third pulse signal may offset EMI derived from the target pulse signal.

During a portion of a period of time for which the target pulse signal makes a transition from a low voltage level to a high voltage level, a selected sensor node and the third sensor node may be controlled to share charges with each other.

According to some embodiments, the third sensor node to which the third pulse signal is applied may be spaced apart from the selected sensor node with other sensor nodes interposed therebetween.

As described with reference to FIGS. 10 and 11, the selected sensor node and the third sensor node may be electrically connected to each other by controlling a connection control switch (e.g., CSW' of FIG. 10) connected between the selected sensor node and the third sensor node. Hence, the time needed to use a driving voltage to generate the target pulse signal and the third pulse signal may be reduced, so that an electric field resulting from the use of the driving voltage can be reduced. Consequently, EMI caused by the target pulse signal and the third pulse signal can be further mitigated.

According to some embodiments, the third sensor node may be spaced apart from the selected sensor node with other sensor nodes interposed therebetween. For example, the first and second sensor nodes may be located between the selected sensor node and the third sensor node.

Figure 14:
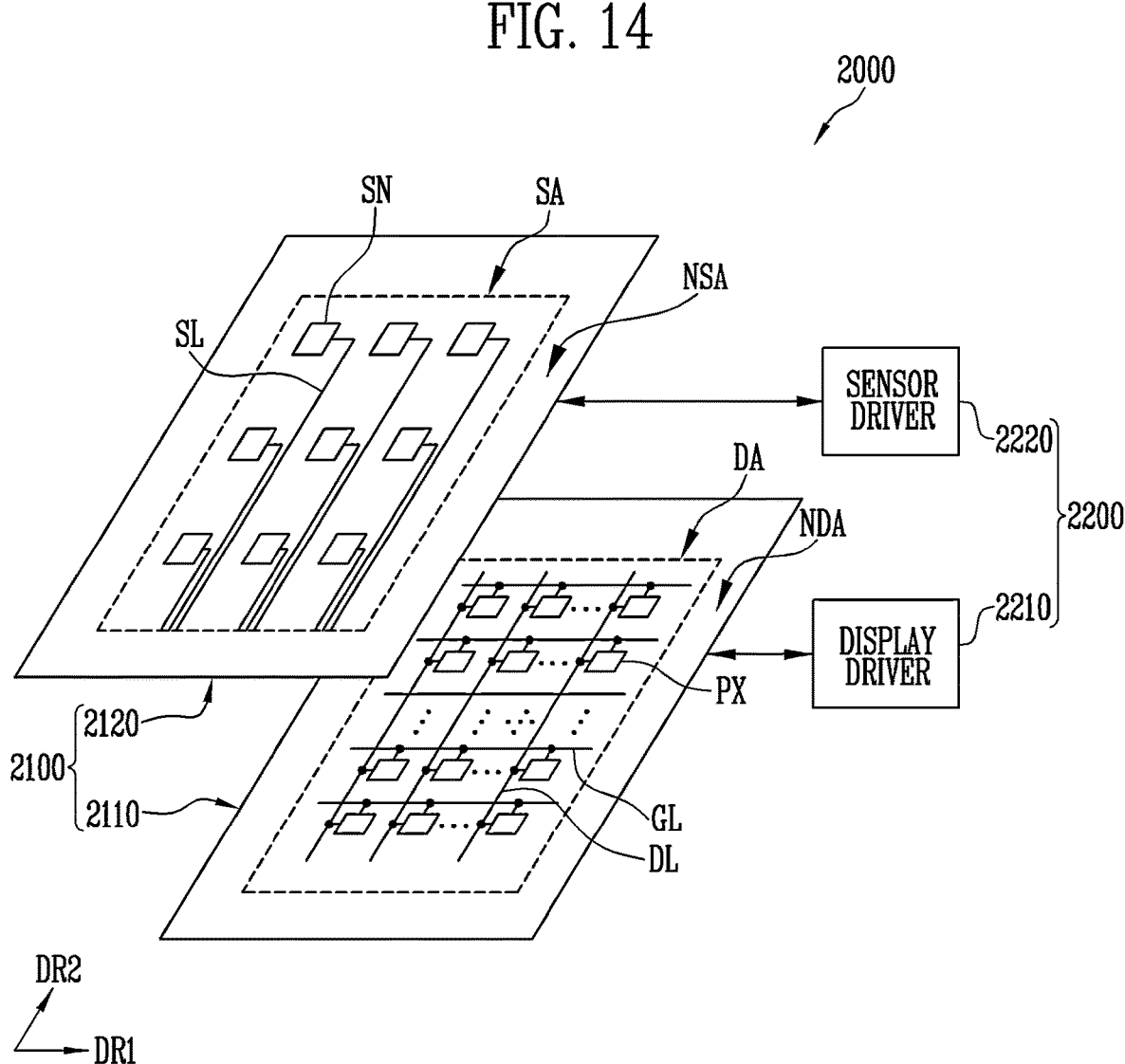
FIG. 14 is a block diagram illustrating aspects of a display device including the sensor driver of FIG. 1 according to some embodiments.

FIG. 14 is a block diagram illustrating aspects of a display device 2000 including the sensor driver of FIG. 1 according to some embodiments.

Referring to FIG. 14, the display device 2000 may include a panel 2100, and a panel driver 2200 configured to drive the panel 2100.

The panel 2100 may include a display panel 2110 and a touch panel 2120 which overlaps the display panel 2110.

According to some embodiments, the display panel 2110 and the touch panel 2120 may be manufactured separately from each other, and may be coupled to each other to at least partially overlap each other. According to some embodiments, the display panel 2110 and the touch panel 2120 may be manufactured to be integrated with each other. In this case, the touch panel 2120 may be directly formed on at least one layer, which forms the display panel 2110, for example, on an upper substrate, a thin film encapsulation layer, or an insulating layer of the display panel 2110.

Although FIG. 14 illustrates that the touch panel 2120 is located over the display panel 2110, embodiments are not limited thereto. For instance, the touch panel 2120 may be located under the display panel 2110.

The display panel 2110 may include a display area DA formed to display an image, and a non-display area NDA provided around the display area DA. The non-display area NDA may at least partially enclose the display area DA.

The display panel 2110 may include pixels PX arranged on a substrate in a first direction DR1 and a second direction DR2. The pixels PX may be located in the display area DA. According to some embodiments, the substrate may be a rigid substrate including material such as glass or reinforced glass. According to some embodiments, the substrate may be a flexible substrate including material such as plastic or metal.

The pixels PX are connected to scan lines GL extending in the first direction DR1 and data lines DL extending in the second direction DR2. The pixels PX may be selected by turn-on level scan signals supplied through the scan lines GL, and may receive data signals through the data lines DL. Hence, the pixels PX may emit light having luminance corresponding to the data signals so that an image is displayed in the display area DA.

Lines and/or an internal circuit which are connected to the pixels PX may be located in the non-display area NDA. For example, a scan signal driver may further located in the non-display area NDA.

According to some embodiments, the display panel 2110 may include organic light emitting diodes, inorganic light emitting diodes, quantum dot/well light emitting diodes, or the like, as the pixels PX. According to some embodiments, the display panel 2110 may be implemented as a liquid crystal display panel. In this case, the display device 2000 may further include a light source such as a back-light unit.

The touch panel 2120 may include an active area SA capable of sensing a touch, and an inactive area NSA formed around the active area SA. The active area SA may at least partially overlap the display area DA.

The touch panel 2120 may include sensor nodes SN arranged on a sensor substrate in the first direction DR1 and the second direction DR2. The sensor nodes SN may be located in the active area SA. According to some embodiments, the substrate may be a rigid substrate including material such as glass or reinforced glass. According to some embodiments, the substrate may be a flexible substrate including material such as plastic or metal. According to some embodiments, at least one layer which forms the display panel 2110 may be used as a substrate of the touch panel 2120.

The sensor nodes SN may be connected to the sensing lines SL. In the case where the touch panel 2120 is driven in a self-capacitance sensing manner, the sensor nodes SN may be connected one-to-one to the sensing lines SL. The touch panel 2120 may include the sensor array 110 of FIG. 1.

The panel driver 2200 may include a display driver 2210 configured to drive the display panel 2110, and a sensing signal driver 220 configured to drive the touch panel 2120. According to some embodiments, the display driver 2210 and the sensor driver 2220 may be formed of separate integrated chips (ICs). According to some embodiments, the display driver 2210 and the sensor driver 2220 may be mounted in a single IC.

The display driver 2210 may be electrically connected to the display panel 2110, and thus may drive the pixels PX. For example, the display driver 2210 may include a data driver connected to the data lines DL, a scan driver connected to the scan lines GL, and a timing controller configured to control the data driver and the scan driver. For example, the display driver 2210 may include a data driver and a timing controller. The scan driver may be located in the non-display area NDA of the display panel 2110.

The sensor driver 2220 may be connected to the touch panel 2120 to drive the touch panel 2120. The sensor driver 2220 may include the sensor driver 120 of FIG. 1.

The display driver 2210 may display an image on the display panel 2110 on a display frame basis. The sensor driver 2220 may sense a touch on a basis of a sensing frame (e.g., FR of FIG. 4). For example, during a sensing frame, the sensor driver 2220 may select each of the sensor nodes SN and sense a touch. The sensing frame period and the display frame period may be synchronized with each other, or may not be synchronized.

According to some embodiments, the display device 2000 may be employed in electronic devices such as a computer, a laptop, a cellular phone, a smart phone, a personal digital assistants (PDA), a potable multimedia player (PMP), a digital TV, a digital camera, a potable game console, a navigation device, a wearable device, an internet of tings (IoT) device, an internet of everything (IoE) device, an e-book, a virtual reality (VR) device, an augmented reality (AR) device, a navigation device for vehicles, a videophone, a monitoring system, an automatic focus system, a tracking system, and a motion sensor system.

The effects of the present disclosure are not limited by the foregoing, and other various effects are anticipated herein.

Although aspects of certain embodiments and implementations have been described herein, other embodiments and modifications will be apparent from the foregoing description. Accordingly, the concepts of embodiments according to the present disclosure are not limited to the foregoing embodiments, but rather to the broader scope of the presented claims, and their equivalents, and various obvious modifications and equivalent arrangements.

What is claimed is:

1. An electronic device comprising:
   a display panel including pixels;
   a sensor array overlapping the display panel and including sensor nodes; and
   a panel driver to select one of the sensor nodes to sense a touch of a user, apply a first pulse signal to at least one first sensor node of the sensor nodes adjacent to the selected sensor node, and apply a second pulse signal having a polarity reverse to a polarity of the first pulse signal to at least one second sensor node of the sensor nodes,
   wherein the panel driver is configured to control the first sensor node and the second sensor node to share charges with each other during a portion of a period of time for which the first and second pulse signals are applied.

2. The electronic device of claim 1, wherein the second sensor node is adjacent to the first sensor node.

3. The electronic device of claim 1, wherein the first sensor node is adjacent to the selected sensor node without another sensor node interposed between the selected sensor node and the first sensor node.

4. The electronic device of claim 1, wherein a number of the at least one second sensor node to which the second pulse signal is applied is identical to a number of the at least one first sensor node to which the first pulse signal is applied.

5. The electronic device of claim 1, further comprising signal lines to connect the sensor nodes to the panel driver, wherein the panel driver is configured to control the sensor nodes through the signal lines.

6. The electronic device of claim 5, wherein the signal lines comprise a first signal line connected to the first sensor node and a second signal line connected to the second sensor node, and
wherein the panel driver includes a switch connected between the first signal line and the second signal line, and is configured to turn on the switch such that the first sensor node and the second sensor node share charges with each other during the portion of the period of time.

7. The electronic device of claim 1, wherein each of the first and second pulse signals toggles between a first voltage level and a second voltage level,
wherein during a first partial time period of the period of time for which the first and second pulse signals are applied, the first pulse signal transitions from the first voltage level to the second voltage level, and the second pulse signal transitions from the second voltage level to the first voltage level, and
wherein the panel driver is configured to control the first sensor node and the second sensor node to share charges with each other during a first portion of the first partial time period.

8. The electronic device of claim 7, wherein the panel driver is configured to bias the first sensor node to the second voltage level and bias the second sensor node to the first voltage level during a second portion of the first partial time period following the first portion of the first partial time period.

9. The electronic device of claim 7, wherein during a second partial time period of the period of time for which the first and second pulse signals are applied, the first pulse signal transitions from the second voltage level to the first voltage level, and the second pulse signal transitions from the first voltage level to the second voltage level, and
wherein the panel driver is configured to control the first sensor node and the second sensor node to share charges with each other during a first portion of the second partial time period.

10. The electronic device of claim 9, wherein the panel driver is configured to bias the first sensor node to the first voltage level and bias the second sensor node to the second voltage level during a second portion of the second partial time period following the first portion of the second partial time period.

11. The electronic device of claim 1, wherein the panel driver is configured to control the first sensor node and the second sensor node to share charges with each other during the portion of the period of time by electrically connecting the first sensor node and the second sensor node to each other.

12. The electronic device of claim 1, wherein the panel driver is configured to select the one of the sensor nodes by applying a third pulse signal to the one of the sensor nodes.

13. The electronic device of claim 12, wherein the panel driver is configured to apply a fourth pulse signal to a third sensor node of the sensor nodes,
wherein each of the third and the fourth pulse signals toggles between a first voltage level and a second voltage level,
wherein, during the period of time for which the first and second pulse signals are applied, the third pulse signal transitions from the first voltage level to the second voltage level, and the fourth pulse signal transitions from the second voltage level to the first voltage level.

14. The electronic device of claim 13, wherein the first and the second sensor nodes are between the selected sensor node and the third sensor node.

15. The electronic device of claim 13, wherein the panel driver is configured to control the selected sensor node and the third sensor node to share charges with each other during a portion of the period of time for which the third pulse signal transitions from the first voltage level to the second voltage level.

16. The electronic device of claim 13, wherein the panel driver is configured to bias, during a period of time for which a voltage level of the third pulse signal gradually decreases from the second voltage level, the third sensor node to the second voltage level without controlling the selected sensor node and the third sensor node to share charges with each other.

17. The electronic device of claim 1, wherein the panel driver comprises:
a display driver to control the display panel; and
a sensor driver to control the sensor array.

18. An electronic device comprising:
a panel comprising sensor array having sensor nodes; and
a panel driver to, when one of the sensor nodes is selected to sense a touch of a user, apply a first pulse signal to at least one first sensor node of the sensor nodes adjacent to the selected sensor node, and apply a second pulse signal having a polarity reverse to a polarity of the first pulse signal to at least one second sensor node of the sensor nodes,
the panel driver is configured to control the first sensor node and the second sensor node to share charges with each other during a portion of a period of time for which the first and second pulse signals are applied.

19. The electronic device of claim 18, wherein the panel further comprises a display panel overlapping the sensor array and including pixels.

* * * * *